United States Patent
Jiang et al.

(10) Patent No.: US 7,522,377 B1
(45) Date of Patent: Apr. 21, 2009

(54) MAGNETIC WRITE HEAD WITH HIGH MOMENT MAGNETIC THIN FILM FORMED OVER SEED LAYER

(75) Inventors: Hai Jiang, Fremont, CA (US); Kyusik Sin, Pleasanton, CA (US); Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 590 days.

(21) Appl. No.: 11/009,753

(22) Filed: Dec. 10, 2004

Related U.S. Application Data

(63) Continuation-in-part of application No. 10/853,416, filed on May 24, 2004, now Pat. No. 7,177,117, which is a continuation-in-part of application No. 10/137,030, filed on May 1, 2002, now Pat. No. 6,778,358.

(51) Int. Cl.
*G11B 5/147* (2006.01)

(52) U.S. Cl. ............... 360/125.12; 360/125.26; 360/125.5; 360/125.63; 428/816

(58) Field of Classification Search ............ 360/125.12, 360/125.26, 125.5, 125.63; 428/812, 813, 428/816
See application file for complete search history.

(56) References Cited

U.S. PATENT DOCUMENTS

| | | | |
|---|---|---|---|
| 4,589,042 A | 5/1986 | Anderson et al. | |
| 5,268,806 A * | 12/1993 | Goubau et al. | 360/322 |
| 5,606,478 A | 2/1997 | Chen et al. | |
| 5,858,566 A * | 1/1999 | Zhang | 428/831 |
| 5,874,010 A | 2/1999 | Tao et al. | |
| 5,894,388 A * | 4/1999 | Sato et al. | 360/125.51 |
| 6,118,628 A | 9/2000 | Sano et al. | |
| 6,132,892 A * | 10/2000 | Yoshikawa et al. | 428/812 |
| 6,259,583 B1 | 7/2001 | Fontana, Jr. et al. | |
| 6,353,511 B1 | 3/2002 | Shi et al. | |
| 6,449,122 B1 | 9/2002 | Yazawa et al. | |
| 6,490,131 B2 | 12/2002 | Sano et al. | |
| 6,496,337 B1 * | 12/2002 | Wang et al. | 360/324.12 |
| 6,538,845 B1 | 3/2003 | Watanabe et al. | |
| 6,541,065 B1 | 4/2003 | Sasaki et al. | |
| 6,592,725 B2 * | 7/2003 | Lin et al. | 204/192.2 |
| 6,641,935 B1 | 11/2003 | Li et al. | |
| 6,645,647 B1 | 11/2003 | Litvinov et al. | |
| 6,646,827 B1 | 11/2003 | Khizroev et al. | |
| 6,667,118 B1 | 12/2003 | Chang et al. | |
| 6,680,831 B2 | 1/2004 | Hiramoto et al. | |
| 6,713,197 B2 | 3/2004 | Nakamura et al. | |

(Continued)

OTHER PUBLICATIONS

IEEE Transactions on Magnetics article entitled "Magnetic and Structural Properties of FeCoB Thin Films", by C. L. Platt et al., vol. 37, No. 4, Jul. 2001, pp. 2302-2304.

(Continued)

*Primary Examiner*—Brian E Miller

(57) ABSTRACT

A magnetic write head includes a seed layer and a magnetic layer on the seed layer. The seed layer includes seed-layer grains having either a face-centered cubic (fcc) crystalline structure with a surface plane substantially oriented in a [111] direction or a hexagonal-close-packed (hcp) crystalline structure with a surface plane substantially oriented in a [0001] direction. The magnetic layer includes magnetic-layer grains having a body-centered-cubic (bcc) crystalline structure with a surface plane substantially oriented in a [110] direction.

18 Claims, 15 Drawing Sheets

U.S. PATENT DOCUMENTS

| | | | |
|---|---|---|---|
| 6,714,380 | B2 | 3/2004 | Kawasaki et al. |
| 6,723,449 | B2* | 4/2004 | Kudo et al. ............... 428/811.2 |
| 6,773,556 | B1 | 8/2004 | Brockie et al. |
| 6,777,066 | B1 | 8/2004 | Chang et al. |
| 6,778,358 | B1 | 8/2004 | Jiang et al. |
| 6,805,966 | B1 | 10/2004 | Formato et al. |
| 6,815,082 | B2 | 11/2004 | Girt |
| 6,835,475 | B2 | 12/2004 | Carey et al. |
| 6,844,724 | B1 | 1/2005 | Peng et al. |
| 6,853,519 | B2* | 2/2005 | Parker et al. ................. 360/322 |
| 6,953,629 | B2* | 10/2005 | Hintz et al. .................. 428/827 |
| 6,970,324 | B2 | 11/2005 | Ikeda et al. |
| 7,177,117 | B1 | 2/2007 | Jiang et al. |
| 7,220,499 | B2* | 5/2007 | Saito et al. ............... 428/811.5 |
| 7,294,418 | B2* | 11/2007 | Ikeda et al. .................. 428/816 |
| 2001/0008712 | A1 | 7/2001 | Yazawa et al. |
| 2002/0008936 | A1 | 1/2002 | Kawasaki et al. |
| 2002/0181170 | A1* | 12/2002 | Lin et al. ............... 360/324.11 |
| 2003/0035253 | A1* | 2/2003 | Lin et al. .................... 360/324 |
| 2003/0186086 | A1* | 10/2003 | Abarra et al. ............ 428/694 TS |
| 2003/0197988 | A1 | 10/2003 | Hasegawa et al. |
| 2003/0205459 | A1* | 11/2003 | Lin et al. .................. 204/192.2 |
| 2004/0042130 | A1* | 3/2004 | Lin et al. ............... 360/324.12 |
| 2004/0058196 | A1* | 3/2004 | Lambeth ............... 428/694 BH |
| 2004/0228044 | A1* | 11/2004 | Hasegawa et al. ........ 360/324.1 |
| 2005/0011590 | A1 | 1/2005 | Kawasaki et al. |
| 2005/0024793 | A1* | 2/2005 | Nakabayashi et al. .. 360/324.11 |
| 2005/0068694 | A1* | 3/2005 | Nakabayashi et al. .. 360/324.11 |
| 2005/0073778 | A1* | 4/2005 | Hasegawa et al. ........ 360/324.1 |
| 2005/0135021 | A1* | 6/2005 | Hasegawa et al. ...... 360/324.11 |
| 2006/0198060 | A1* | 9/2006 | Ishizone et al. ........ 360/324.12 |

OTHER PUBLICATIONS

IEEE Transactions on Magnetics article entitled "Magnetic Properties of RF Diode Sputtered $Co_x Fe_{100-x}$ Alloy Thin Films", by E. J. Yun et al., vol. 32, No. 5, Sep. 1996, pp. 4535-4537.

IEEE Transactions on Magnetics article entitled "Soft High Saturation Magnetization $(Fe_{0.7} Co_{0.3})_{1-x} N_x$", by N. X. Sun et al., vol. 36, No. 5, Sep. 2000, pp. 2506-2508.

IEEE Transactions on Magnetics article entitled "Magnetic Properties of FeCoV Film Sandwiched by Thin Soft-Magnetic Films", by T. Nozawa et al., vol. 37, No. 4, Jul. 2001, pp. 3033-3038.

IEEE Transactions on Magnetics article entitled "High Moment FeCoNi Alloy Thin Films Fabricated by Pulsed-Current Electrodeposition", by X. Liu et al., vol. 37, No. 4, Jul. 2001, pp. 1764-1766.

American Institute of Physics article entitled "Improvement of Soft Magnetism of $Fe_{90} Co_{10}$ Sputtered Films by Addition of N and Ta", by S. Nakagawa et al., J. Appl. Phys. 79 (8), Apr. 15, 1996, pp. 5156-5158.

N. X. Sun, S. X. Wang, Chin-Ya Hung, Chester Cheng and Hua-Ching Tong, "Microstructure and soft magnetic properties of high saturation magnetization Fe-Co-N alloy thin films", MRS Spring Meeting, Section F, Apr. 2000.

S. Wang, et al., "Improved high moment FeAlN/SiO2 laminated materials for thin film recording heads", IEEE Trans. Magn. vol. 27, Nov. 1991, pp. 4879-4881.

B.D. Cullity, Introduction to Magnetic Materials, p. 148, Addison-Wesley, 1972.

B. Viala, M.K. Minor, and J.A. Barnard, "Microstructure and magnetism in FeTaN films deposited in the nanocrystalline state", Abstract, J. Appl. Phys., vol. 80(7), Oct. 1996, p. 3941.

Yingjian Chen, "High moment FeRhN and FeTaN for advanced writer applications", Western Digital internal material, Jul. 1998.

Makoto Munakata, et al., "Thickness Effect on 1 GHz Permeability of (CoFeB)-(SiO2) Films with High Electrical Resistivity", IEEE Transactions on Magnetics, vol. 37, No. 4, Jul. 2001, pp. 2258-2260.

P.C. Kuo, et al., "Microstructure and magnetic properties of FeCoN thin films", Journal of Applied Physics, vol. 83, No. 11, Jun. 1998, pp. 6643-6645.

L.H. Chen, et al., "Soft-magnetic properties of Fe-Co-B thin films for ultra-high-frequency applications", Journal of Applied Physics, vol. 87, No. 9, May 2000, pp. 5858-5860.

K.H. Kim, et al., "The magnetic properties of nanocrystalline Fe-Co(Cr)-Hf-N thin films", Journal of Applied Physics, vol. 87, No. 9, May 2000, pp. 5248-5250.

* cited by examiner

MAGNETIC WRITE HEAD WITH HIGH MOMENT MAGNETIC THIN FILM FORMED OVER SEED LAYER

CLAIM OF PRIORITY

This application is a continuation-in-part of U.S. patent application No. 10/853,416, filed May 24, 2004, entitled "Magnetically Soft, High Saturation Magnetization Laminates of Iron-Cobalt-Nitrogen and Iron-Nickel for Magnetic Head Pole Layers," which is incorporated in its entirety by reference herein, and which is a continuation-in-part of U.S. patent application No. 10/137,030, filed May 1, 2002, issued on Aug. 17, 2004, entitled "magnetically Soft, High Saturation Magnetization Laminates of Iron-Cobalt-Nitrogen and Iron-Nickel," which is incorporated in its entirety by reference herein.

BACKGROUND OF THE INVENTION

1. Field of the Invention

The present invention relates generally to magnetic heads for disk drives or tape drives, and relates more specifically to magnetic write heads having magnetic layer structures.

2. Description of the Related Art

Electromagnetic transducers, such as heads for disk drives or tape drives, commonly include one or more magnetically "soft" layers. The soft layers have high magnetic permeabilities and low magnetic coercivities, and can be used as good conductors of magnetic flux. Examplary magnetically soft materials include Permalloy (approximately $Ni_{0.81}Fe_{0.19}$), which can be formed in thin layers to create magnetic feature. For example, an inductive head may include a magnetic core comprising Permalloy in which adjacent conductive coils induce magnetic flux. The flux within the magnetic core is then employed to magnetize a portion (e.g., a data bit) of an adjacent media. The inductive head may also read signals from the media by magnetic induction (e.g., bringing the magnetic core near the magnetized media portion so that the flux from the media portion induces a flux in the magnetic core, the changing flux in the core then inducing an electric current in the coils). Alternatively, instead of inductively sensing media fields, magnetoresistive (MR) sensors or merged heads that include MR or giant magnetoresistive (GMR) sensors read signals by sensing a change in electrical resistance of the sensor due to the magnetic signal.

The sizes of transducer elements have decreased for many years in attempts to increase the magnetic storage density. However, smaller transducer elements are more prone to magnetic saturation, in which the elements (e.g., magnetic pole layers) are saturated by the magnetic flux, such that any additional flux is not conducted through the element. Magnetic saturation is particularly troublesome when the ends of the pole layers closest to the media (commonly termed pole tips) are saturated. Such magnetic saturation limits the amount of flux transmitted through the pole tips, thereby limiting the amount of flux available for the writing or reading of signals. Moreover, such magnetic saturation also blurs the writing or reading of signals, because the magnetic flux is more evenly dispersed over an entire pole tip instead of being focused in a corner that has relatively high flux density.

To deliver higher magnetic flux through the poles, high magnetic saturation materials (also known as high moment or high $B_S$ materials) have been used in magnetic core elements. For instance, iron is known to have a higher magnetic moment than nickel, so increasing the proportion of iron compared to nickel generally yields a higher moment alloy. Iron, however, is also more corrosive than nickel, which imposes a limit to the concentration of iron that is feasible for many applications.

It is difficult to achieve soft magnetic properties for primarily-iron NiFe alloys (e.g., alloys with an atomic concentration of iron that is greater than the atomic concentration of nickel) compared to primarily-nickel NiFe alloys (e.g., alloys with an atomic concentration of nickel that is greater than the atomic concentration of iron). The magnetic softness of a material depends on both the microstructure and the intrinsic properties of the material. The intrinsic properties include the magneto-crystalline anisotropy and the magneto-elastic energy, which depends on the magnetostriction and stress. Materials with higher magnetostriction and magnetic-crystalline anisotropy are generally magnetically-harder. For example, although FeCo has a high magnetic moment of approximately 2.45 Tesla (or 24.5 kilogauss), it also has relatively higher magnetostriction magneto-crystalline anisotropy. Therefore, FeCo normally demonstrates magnetically-hard properties.

Anderson et al., in U.S. Pat. No. 4,589,041 teach the use of high moment $Ni_{0.45}Fe_{0.55}$ for pole tips. Anderson et al. do not use $Ni_{0.45}Fe_{0.55}$ throughout the core due to problems with permeability of that material, which Anderson et al. suggest is due to relatively high magnetostriction of $Ni_{0.45}Fe_{0.55}$. As noted in U.S. Pat. No. 5,606,478 to Chen et al., the use of high moment materials has also been proposed for layers of magnetic cores located closest to a gap region separating the cores. Also noted by Chen et al. are some of the difficulties presented by these high moment materials, including challenges in forming desired elements and corrosion of the elements once formed. Chen et al. state that magnetostriction is another problem with $Ni_{0.45}Fe_{0.55}$, and disclose magnetic heads having Permalloy material layers that counteract the effects of magnetostriction. This balancing of positive and negative magnetostriction with plural NiFe alloys is also described in U.S. Pat. No. 5,874,010 to Tao et al.

Primarily-iron FeCo alloys (e.g., alloys with an atomic concentration of iron greater than the atomic concentration of cobalt) have a very high saturation magnetization but also a high magnetostriction that makes these materials unsuitable for many head applications. Due to the high magnetostriction, mechanical stresses created during slider fabrication or use can perturb the desirable magnetic domain patterns of the head. FIG. 1 is a plot of a B/H loop of an exemplary prior art FeCoN layer that was formed by sputtering deposition at room temperature. The FeCoN layer has a thickness of approximately 500 Angstroms and has a composition of approximately $Fe_{0.66}Co_{0.28}N_{0.06}$. The applied H-field is shown in oersteds (Oe) across the horizontal axis of FIG. 1 while the magnetization (B) of the FeCoN layer is plotted in normalized units along the vertical axis of FIG. 1, with unity defined as the saturation magnetization. The FeCoN layer has a saturation magnetization ($B_S$) of approximately 24.0 kilogauss and is magnetically isotropic, as shown by the single B/H loop. The B/H loop also indicates a relatively high coercivity of about 80 oersteds, which may be unsuitable for applications requiring soft magnetic properties.

In an article entitled "Microstructures and Soft Magnetic Properties of High Saturation Magnetization Fe-Co-N Alloy Thin Films," Materials Research Society, Spring meeting, Section F, April 2000, N. X. Sun et al. report the formation of FeCoN films having high magnetic saturation but also having high magnetostriction and moderate coercivity. Sun et al. also report the formation of a thin film structure in which FeCoN is grown on and capped by Permalloy, to create a sandwich structure having reduced coercivity but compressive stress.

The magnetostriction of this sandwich structure, while somewhat less than that of the single film of FeCoN, may still be problematic for head applications.

DETAILED DESCRIPTION OF EXEMPLARY EMBODIMENTS

Figure 1:
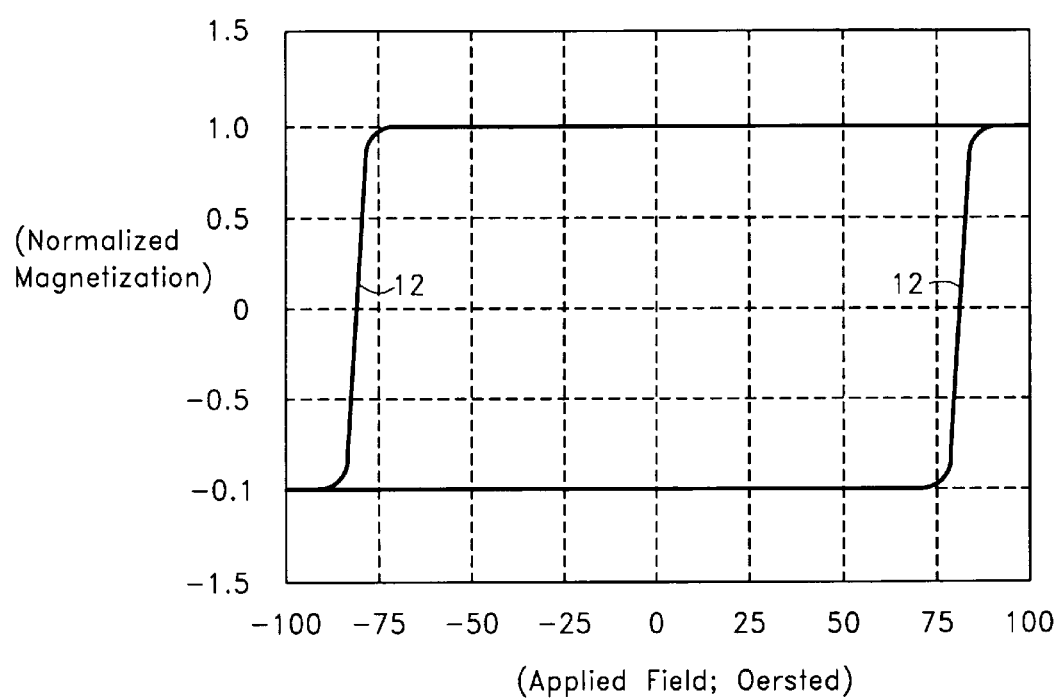
FIG. 1 is a plot of a B/H loop of an exemplary prior art FeCoN layer.
Figure 2:
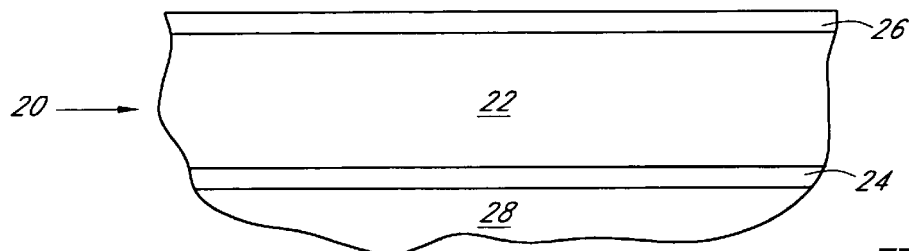
FIG. 2 schematically illustrates a cutaway cross-sectional view of a sandwich structure made of an FeCoN layer affixed between a pair of FeNi layers.

FIG. 2 schematically illustrates a cutaway cross-sectional view of a sandwich structure 20 made of an iron-cobalt-nitride (FeCoN) layer 22 affixed between a pair of iron-nickel (FeNi) layers 24 and 26. In certain embodiments, the sandwich structure 20 is formed on a substrate 28 that provides a smooth surface promoting favorable crystallographic growth of layers 22, 24 and 26. The FeCoN layer 22 of certain embodiments has a thickness of approximately 475 Angstroms and has a composition of approximately $(Fe_{0.70}Co_{0.30})N$. The FeNi layers 24 and 26 of certain embodiments each have a thickness of approximately 25 Angstroms and have a composition of approximately $Ni_{0.55}Fe_{0.45}$. In certain embodiments, layers 22, 24 and 26 are formed by DC magnetron sputtering deposition at room temperature. Magnetron sputtering has a deposition rate that is approximately ten times faster than that of RF sputtering, which is an advantage in commercial applications such as magnetic head production. Examplary materials for the substrate 28 include, but are not limited to, silicon dioxide, alumina, chromium, tantalum, and titanium.

Figure 3:
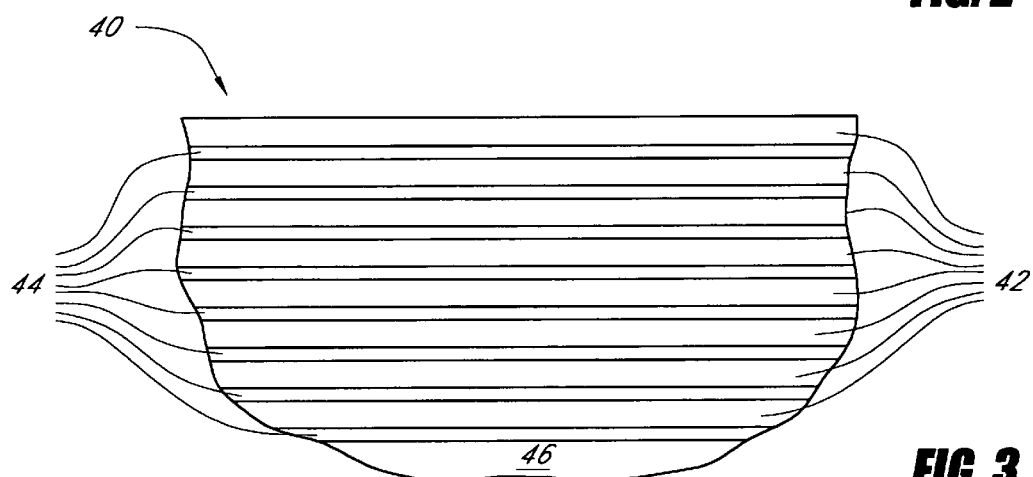
FIG. 3 schematically illustrates a cutaway cross-sectional view of a laminated structure made of a plurality of FeCoN layers interleaved with a plurality of FeNi layers.

FIG. 3 schematically illustrates a cutaway cross-sectional view of a laminated structure 40 made of a plurality of FeCoN layers 42 interleaved with a plurality of FeNi layers 44. The laminated structure 40 of certain embodiments is formed on a substrate 46 that provides a surface promoting favorable microstructural growth of layers 42 and 44. In certain embodiments, layers 42 and 44 are formed by magnetron sputtering deposition on the substrate 46 at room temperature.

In certain embodiments, each FeCoN layer 42 comprises more iron than cobalt or nitrogen and each FeNi layer 44 comprises more iron than nickel. In certain embodiments, the FeCoN layers 42 have atomic concentrations of iron in a range between 50% and 80%, atomic concentrations of cobalt in a range between 17% and 50%, and atomic concentrations of nitrogen in a range between 0.01% and 3%. In certain embodiments, the NiFe layers 44 have atomic concentrations of iron in a range between 30% and 70%, and atomic concentrations of nickel in a range between 70% and 30%. In an exemplary embodiment, each FeCoN layer 42 has a thickness of approximately 475 Angstroms and a composition of approximately $(Fe_{0.70}Co_{0.30})N$. In another exemplary embodiment, each FeNi layer 42 has a thickness of approximately 25 Angstroms and have a composition of approximately $Ni_{0.55}Fe_{0.45}$. Various other compositions and thicknesses are compatible with embodiments described herein. The thickness of any of the layers may, for example, be in a range between a few angstroms and one hundred nanometers.

Figure 4:
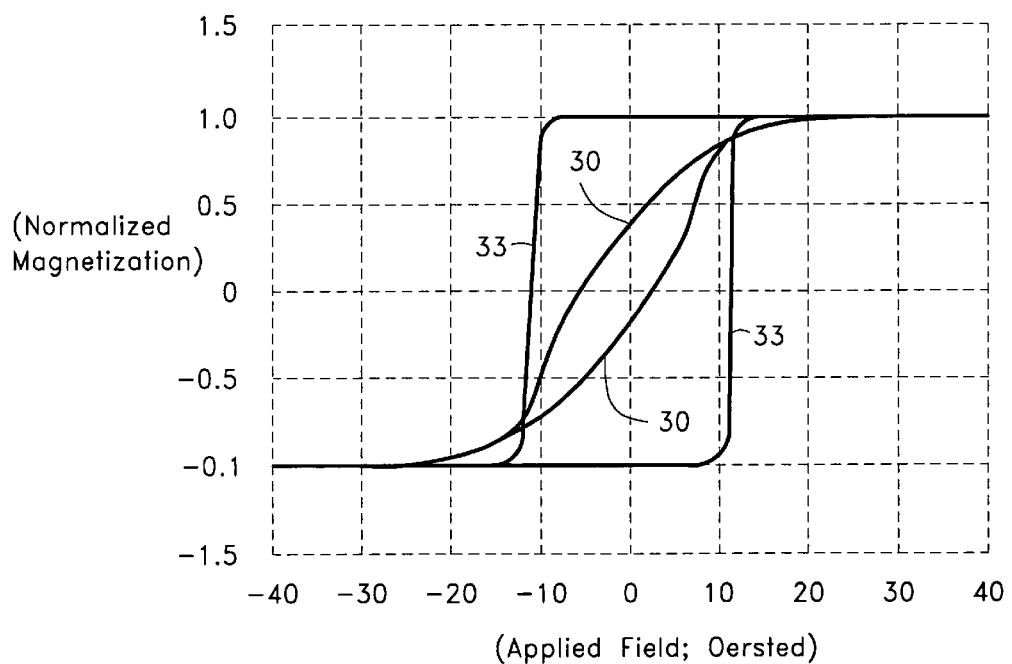
FIG. 4 is a plot of B/H loops for the hard axis and the easy axis of the exemplary laminated structure of FIG. 3.

FIG. 4 is a plot of B/H loops 30 and 33 for an examplary laminated structure 40, as schematically illustrated in FIG. 2, having an overall thickness of about 2500 Angstroms. The laminated structure 40 has a saturation magnetization ($B_S$) of approximately 2.4 tesla (T) (normalized to 1 in FIG. 4), which is nearly that of a single FeCoN layer. The coercivity of the hard axis, which is defined as the applied field of the loop 30 at which the magnetization is zero, is about 4 oersteds (Oe), while the coercivity of the easy axis is about 12 oersteds, as shown by loop 33. The permeability is approximately 2000, and the laminate structure 40 has been found to be suitable for applications such as pole layers for magnetic heads.

Figure 5:
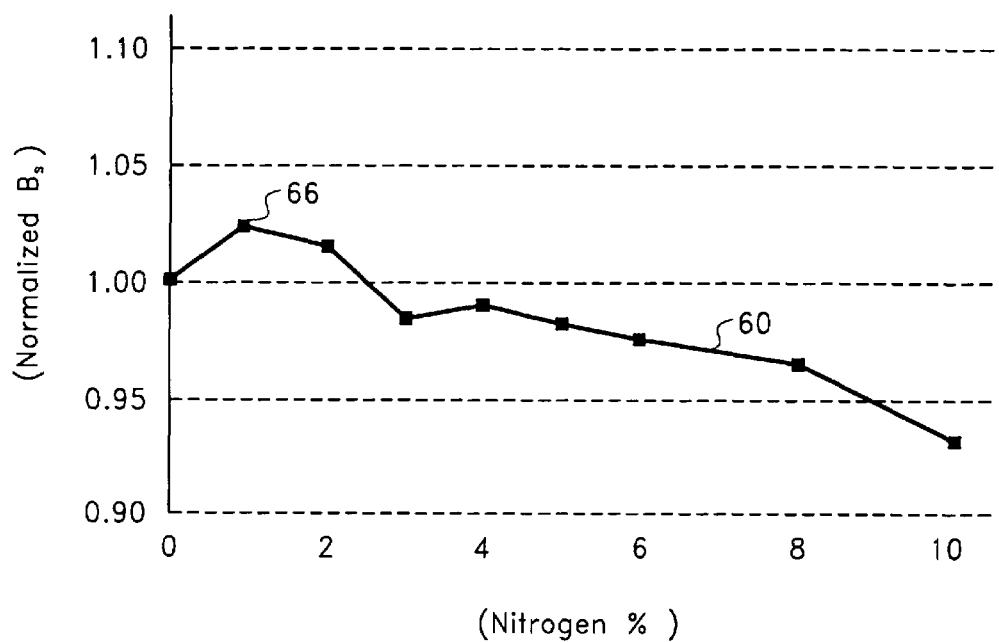
FIG. 5 is a plot of an experimentally determined saturation magnetization as a function of nitrogen gas content for $(Fe_{0.70}Co_{0.30})N$.

FIG. 5 is a plot 60 of an experimentally determined saturation magnetization $B_S$ of FeCoN for various concentrations of nitrogen gas, normalized for zero nitrogen. The plot 60 was generated using a sputtering target of $Fe_{0.70}Co_{0.30}$ and varying the amount of nitrogen gas. The concentration of nitrogen in the solid layer of FeCoN has been found to be about the same as that in the gas. At the wafer level, the concentration of various elements can be determined by Auger Electron Spectroscopy (AES) or Electron Energy Loss Spectroscopy (EELS), while concentrations of various elements of a layer in a device such as a magnetic head can be determined by Transmission Electron Microscopy (TEM). The plot 60 has a peak saturation magnetization $B_S$ at about 1% nitrogen, with $B_S$ generally declining as the nitrogen content is increased above 1%. Besides increasing the peak saturation magnetization, a small amount of nitrogen incorporated into FeCo decreases the grain size of the FeCo layer and makes the FeCo more magnetically-soft. The coercivity of the FeCoN layer generally increases as the nitrogen content of the FeCoN layer declines from approximately 7%, however, arguing against the use of low nitrogen content FeCoN in magnetic heads. A coercivity as high as 30 oersteds can be tolerated for high $B_S$ applications such as pole layers of magnetic heads, so in certain embodiments, the nitrogen content of FeCoN layers for such high $B_S$ applications in which the FeCoN is interleaved with NiFe is selected to be less than about 3%. A laminated structure 40 having lower coercivity may be desirable for other applications such as soft magnetic underlayers for disks, in which having such a high $B_S$ may not be as critical as for pole tips.

A magnetically soft, high-$B_S$ laminate structure 40 is well suited for use in a write pole tip for perpendicular recording. In certain embodiments, a laminated write pole layer is formed entirely of alternating layers of FeCoN and NiFe having an overall thickness of about 3000 Angstroms or less. The laminated write pole layer may be trimmed to have a trapezoidal cross-section, including a trapezoidal write pole tip. The laminated write pole layer does not appear to suffer from excessive magnetostriction, perhaps because it is encapsulated in other solid materials.

Figure 6:
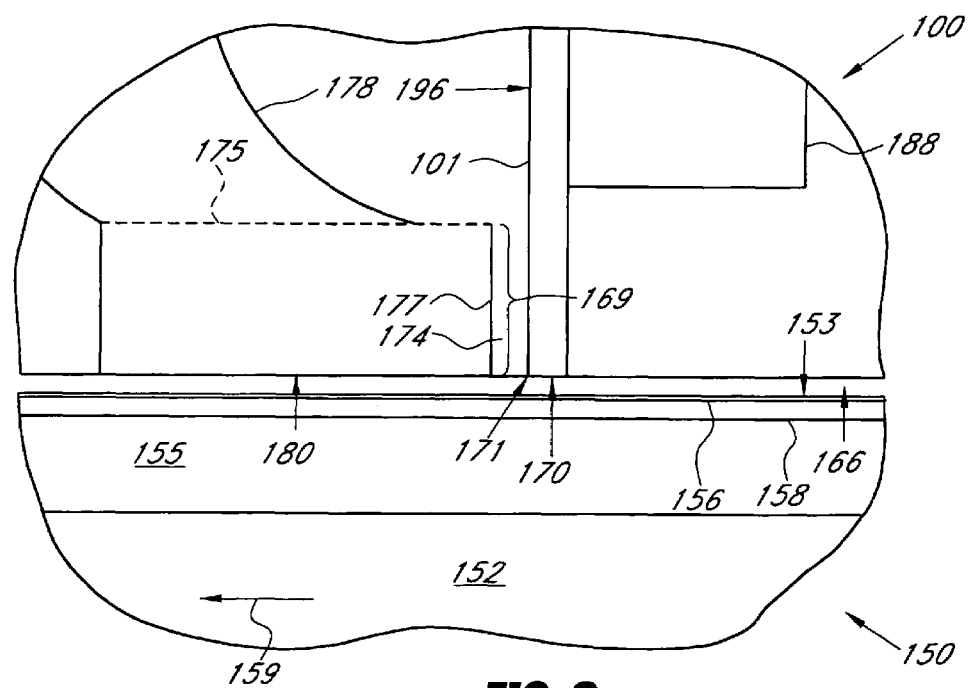
FIG. 6 schematically illustrates a cutaway cross-sectional view of a portion of an exemplary disk drive including a magnetic head designed for perpendicular recording in close proximity to a medium including a soft magnetic underlayer.

FIG. 6 schematically illustrates a cutaway cross-sectional view of a portion of an exemplary disk drive including a magnetic head 100 in accordance with certain embodiments described herein. The magnetic head 100 of FIG. 6 is designed for perpendicular recording on a relatively moving medium 150. The magnetic head 100 includes a write pole layer 101. The write pole layer 101 in certain embodiments is formed of interleaved layers of FeCoN and NiFe similar to that described above, formed to an overall thickness of about 2500 Angstroms. The magnetic head 100 of certain embodiments is spaced from the medium 150 by a nanoscale air bearing, while in other embodiments, the magnetic head 100 is in frequent or continuous contact with the medium 150 during operation. The word nanoscale as used herein is meant to represent a size that is most conveniently described in terms of nanometers, e.g., between about one nanometer and about two hundred nanometers.

The medium 150 includes a substrate 152 over which a soft magnetic underlayer 155 is formed. In certain embodiments, the underlay 155 is also formed of interleaved layers of FeCoN and NiFe similar to that described above. In certain such embodiments, the atomic concentration of nitrogen in the FeCoN layers of the underlayer 155 is about 5%, instead of about 1% for the FeCoN layers of the write pole layer 101. The underlayer 155 of certain embodiments is thinner than is conventional for perpendicular media, for example, less than 500 nanometers, due to the relatively high $B_S$ of over 2.3 T.

As schematically illustrated by FIG. 6, the medium 150 further comprises a media layer 158 is disposed over the underlayer 155. The media layer 158 of certain embodiments has an easy axis of magnetization that is substantially perpendicular to a major surface 153 of the medium 150. A thin, physically hard overcoat 156 separates the media layer 158 from the medium surface 153. During operation, the medium 150, which may for example be a rigid disk, is moving relative to the magnetic head 100 in a direction shown by arrow 159.

The magnetic head 100 schematically illustrated by FIG. 6 has a medium-facing surface 166 disposed adjacent to the medium 150. The write pole layer 101 terminates adjacent to the medium-facing surface 166 at a first pole tip 170, which is sometimes called a write pole tip. A soft magnetic layer 188 adjoins the write pole layer 101 but terminates further from the medium-facing surface 166 than the first pole tip 170. The write pole layer 101 and the soft magnetic layer 188 combine to form a write pole. Another soft magnetic layer 178 is magnetically coupled to the write pole layer 101 in a region that is removed from the medium-facing surface 166 and not shown in FIG. 6. The soft magnetic layer 178 is also magnetically coupled to the write pole layer 101 adjacent to the medium-facing surface 166 by a soft magnetic pedestal 175. The write pole layer 101 is separated from the soft magnetic pedestal 175 by a write gap layer 174. The soft magnetic layer 178 and the soft magnetic pedestal 175 form a return pole layer that terminates adjacent to the medium-facing surface 166 in a second pole top 180. In certain embodiments, at least one electrically conductive coil section (not shown) is disposed between the write pole layer 101 and the soft magnetic layer 178, and another coil section (not shown) is disposed upstream of the soft magnetic layer 188 to induce magnetic flux in the write pole layer 101 and the return pole layer.

Although not apparent in FIG. 6, the return pole tip 180 of certain embodiments has an area that is at least two or three orders of magnitude greater than that of the write pole tip 170. In certain other embodiments, another return pole layer and return pole tip are additionally provided, for example, between the write pole layer 101 and a magnetoresistive (MR) sensor (not shown). The write pole tip 170 of certain embodiments has a substantially trapezoidal shape that has a maximum track width at a trailing corner 171. As the medium 150 passes underneath the write pole tip 170 (in the direction indicted by the arrow 159), the trailing corner 171 is the portion of the write pole tip 170 that last passes a given point on the medium 150. The trailing corner 171 of the write pole tip 170 is approximately equidistant from soft magnetic underlayer 155 and soft magnetic pedestal 175 in certain embodiments, as schematically illustrated by FIG. 6. The write pole layer 170 of certain embodiments has a $B_S$ that is between about 2.35 T and 2.45 T, while the soft magnetic pedestal 175 of certain embodiments has a $B_S$ that is substantially less, e.g., less than 2.0 T.

Figure 7:
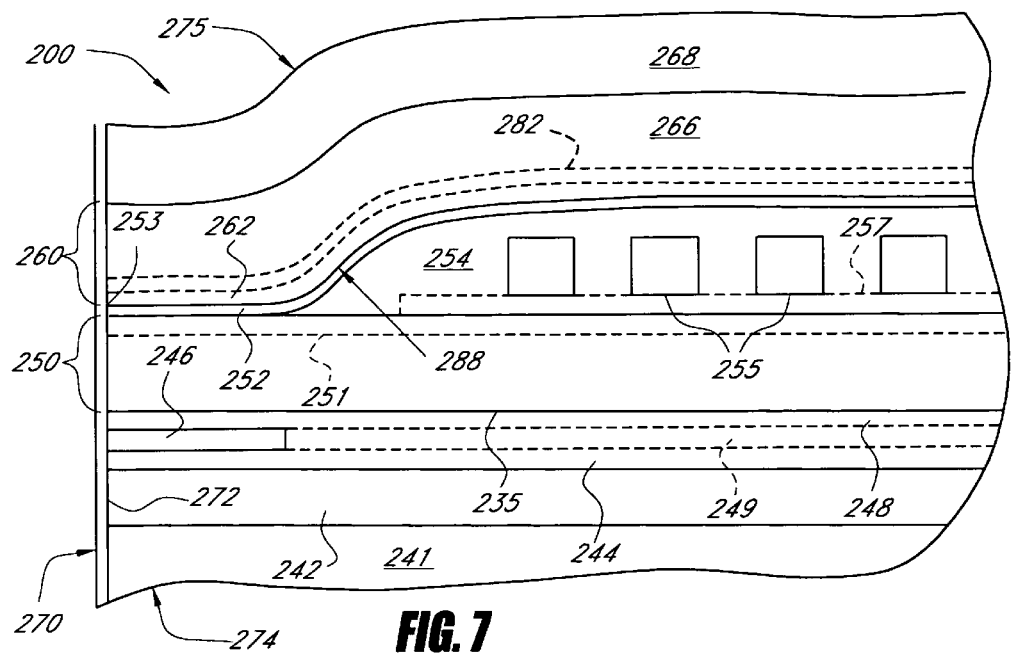
FIG. 7 schematically illustrates a cutaway cross-sectional view of a magnetic head configured for longitudinal recording.

FIG. 7 schematically illustrates a cutaway cross-sectional view of a magnetic head 200 configured for longitudinal recording. The magnetic head 200 of certain embodiments includes laminated high-$B_S$ FeCoN/NiFe pole layers. As described below, the magnetic head 200 of certain embodiments includes a merged magnetoresistive (MR) and inductive transducer. In certain other exemplary embodiments, the laminated high-$B_S$ FeCoN/NiFe pole layers are instead used in a separate inductive transducer, such as in a piggyback head, or in other applications in which magnetically soft, high-$B_S$ materials are desirable.

The magnetic head 200 of the embodiment schematically illustrated by FIG. 7 is formed on a wafer substrate 241. Exemplary materials for the substrate 241 include, but are not limited to, $Al_2O_3$, AlTiC, Si, SiC or other conventional materials. A first magnetically soft shield layer 242 is disposed atop the substrate 241. A first read gap layer 244 comprising an electrically insulating, nonmagnetic material such as $Al_2O_3$ disposed on the shield layer 242. A MR sensor 246 is disposed atop the first read gap layer 244, and a second read gap layer 248 comprising an electrically insulating, nonmagnetic material such as $Al_2O_3$ is disposed on the MR sensor 246. The MR sensor 246 of certain embodiments includes a single layer of an anisotropic magnetoresistive (AMR) material such as Permalloy. In other embodiments, the MR sensor 246 contains plural or multiple layers of senor materials conventionally used to form a spin-valve sensor, a giant magnetoresistive (GMR) sensor, a dual stripe magnetoresistive (DSMR) sensor, or another known type of sensing mechanism. In other embodiments, such as MR sensor 246 is configured for current-perpendicular-to-plane (CPP) operation involving, for example, spin-dependent tunneling (SDT) or spin-valve sensors. The MR sensor 246 of certain embodiments is trimmed to leave an insulating layer 249 formed of a dielectric such as $Al_2O_3$ distal to a media-facing surface 270.

In the embodiment schematically illustrated in FIG. 7, a first write pole layer 250 is disposed atop the second read gap layer 248. The first write pole layer 250 also serves in this merged transducer of FIG. 7 as a second shield layer. In alternative embodiments, the first write pole layer 250 is separate from the second shield layer. The first write pole layer 250 of certain embodiments comprises an electroplated layer 235 of Permalloy or other magnetically-soft materials having higher saturation magnetization, including but not limited to, primarily-iron NiFe alloy (as used herein, the term "primarily-iron" refers to materials having an atomic concentration of iron greater than the atomic concentrations of other constituents of the material, e.g., nickel), FeXN alloy (where X is an element such as Ta, Rb, Al, etc.), or FeCoNi alloy. In certain embodiments, layer 235 is electroplated and then polished to form a smooth surface, upon which a first soft-magnetic structure 251 is formed. The first soft-magnetic structure 251 of certain embodiments includes one or more layers of primarily-iron FeCoN alloy interleaved or laminated with one or more layers of FeNi alloy, and provides a magnetically-soft high-moment material upon which a submicron nonferromagnetic gap layer 252 is formed. The gap layer 252 separates the first write pole 250 from a second write pole layer 260, and magnetic flux communicated between the first and second write pole layers 250, 260 fringes out from a gap layer 252 to write magnetic patterns on an adjacent media.

Figure 8:
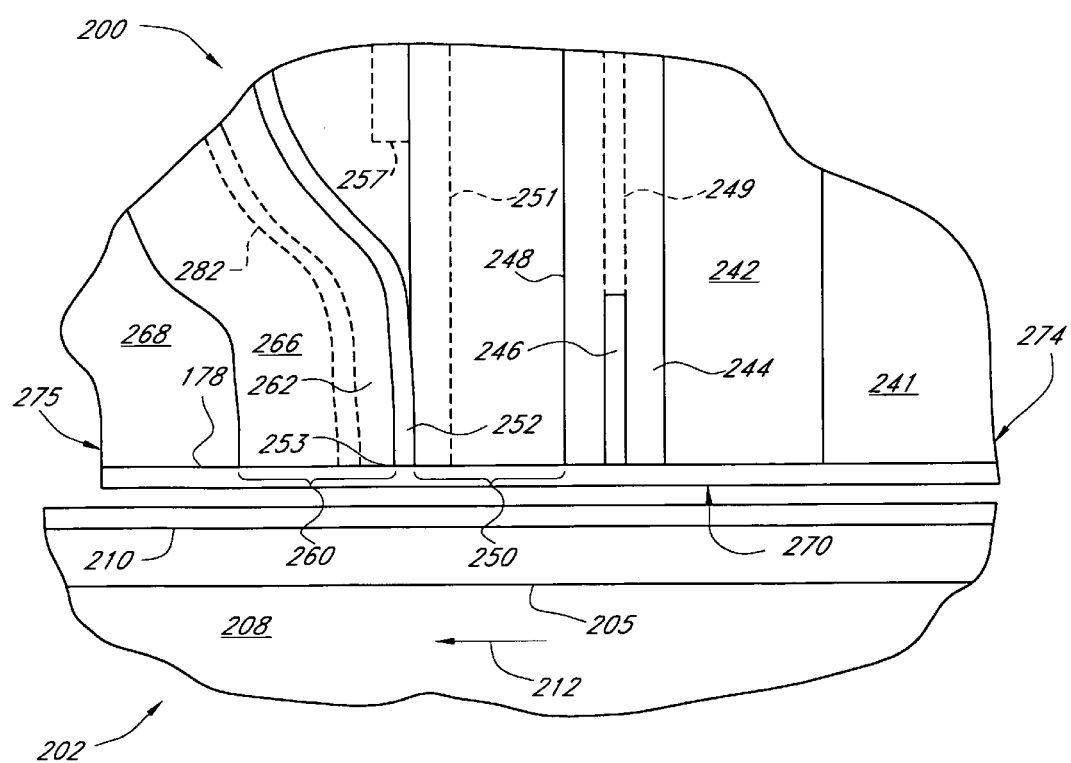
FIG. 8 schematically illustrates a cutaway cross-sectional view of the write head of FIG. 7 disposed in close proximity to a medium.

In certain embodiments of the structure schematically illustrated in FIG. 7, a second soft-magnetic structure 262 is formed on the gap layer 252. The second soft-magnetic structure 262 of certain embodiments includes one or more layers of primarily-iron FeCoN alloy interleaved or laminated with one or more layers of primarily-iron FeNi alloy, and provides a second magnetically-soft high-moment layer adjoining the nonferromagnetic gap layer 252. In certain embodiments, having the second soft-magnetic structure 262 adjoining a trailing edge 253 of the gap layer 252 allows sharply defined, high-density magnetic patterns to be written onto an adjacent medium 202, as schematically illustrated in FIG. 8. As the medium 202 passes underneath the gap layer 252 (in the direction indicated by the arrow 212 of FIG. 8), the trailing edge 253 of the gap layer 252 is the portion of the gap layer 252 which last passes over a given point on the medium 202. Examplary non-magnetic materials for the gap layer 252 include, but are not limited to, dielectric materials such as $Al_2O_3$ or $SiO_2$, or metals such as chromium, tantalum, nickel-iron-tantalum alloy, nickel-niobium alloy, or tantalum-nickel-niobium alloy. The gap layer 252 of certain embodiments serves as a seed layer promoting favorable deposition of the second soft-magnetic structure 262, as described more fully below. In certain embodiments, the second soft-magnetic structure 262 does not suffer from excessive magnetostriction, perhaps because it is encapsulated in other solid materials.

In the embodiment schematically illustrated in FIG. 7, an electrically conductive coil 255 is provided atop an insulating layer 257 to induce magnetic flux in the first and second pole layers 250, 260 for writing signals to a medium. The coil 255 is encircled by baked photoresist 254 that provides insulation between coil sections. In the embodiment schematically illustrated in FIG. 7, the photoresist 254 also provides a sloped surface that allows the first and second pole layers 250, 260 to be separated by several microns adjacent to the coil 255 and by less than two hundred nanometers adjacent to the media-facing surface 270. In other embodiments, the second pole layer 260 is substantially flat, with the magnetic core brought close to the gap layer 252 by an additional magnetic layer, which may be termed a pedestal, adjoining either or both of the first and second pole layers 250, 260. In still other embodiments, such a pedestal is formed adjoining a third pole layer that curves in a similar fashion as the second pole layer 260, with the pedestal and the third pole layer stitched together adjacent to the media-facing surface 270. In certain embodiments, the write pole tip adjoining the trailing portion 253 of the gap layer 252 comprises laminated FeCoN/FeNi, and has a track-width dimension of less than 200 nanometers.

One or both of the first and second soft-magnetic structures 251, 262 of certain embodiments are formed as a plurality of DC magnetron sputtered layers, beginning with NiFe having an atomic concentration of both nickel and iron in a range between about 30% and 70%, and which is formed to a thickness of approximately 20 Angstroms to approximately 30 Angstroms. In certain alternative embodiments in which the gap layer 252 comprises Cr or NiNb, the initial layer of one or both of the first and the second soft-magnetic structures 251, 262 are formed of primarily-iron FeCoN alloy.

In certain embodiments in which the second soft-magnetic structure 262 comprises a laminated structure, after formation of at least three layers of the primarily-iron FeCoN alloy interleaved with at least three layers of the FeNi alloy, a cap layer 282 of FeCoNi alloy is formed by RF sputtering atop the second soft-magnetic structure 262. A layer 266 of FeCoNi alloy having atomic concentrations of elements that are substantially identical to that of the cap layer 282 are formed in certain embodiments by electroplating. In certain embodiments, such a cap layer 282 is denser and less subject to corrosion than the laminated second soft-magnetic structure 262 of CoNiFe alloy, particularly in regions in which the laminated second soft-magnetic structure 262 is more porous and defect-prone (e.g., in a sloped region 288 of the pole layer 260). In certain embodiments, forming a cap layer 282 having a similar concentration of metals as does the electroplating solution also helps to avoid chemical reactions that may otherwise remove parts of the laminated second soft-magnetic structure 262.

In certain other embodiments, the second pole layer 260 is formed entirely of a magnetically-soft laminated FeCoN alloy/FeNi alloy structure having a high-saturation magnetization. Such embodiments are feasible due to the relatively high deposition rate of magnetron sputtering, so that, for example, a laminated structure a few microns in thickness is formed in less than one hour.

In certain embodiments, after formation of the second pole layer 260, the second pole layer 260 is masked and trimmed by a directional etching process, such as ion-beam etching (IBE) to define a trailing pole tip. The etching of certain embodiments is designed to also cut into the first pole layer 250, creating a leading pole tip that is aligned with the trailing pole tip. A protective coating layer 268 is then formed on what will become a trailing end 275 of the magnetic head 200, after which the wafer substrate 241 and transducer layers are diced into thousands of heads. As the medium 202 passes underneath the magnetic head 200 (in the direction indicated by the arrow 212 of FIG. 8), the trailing end 275 of the magnetic head 200 is the portion of the magnetic head 200 which last passes over a given point on the medium 202. Exemplary materials for the protective coating layer 268 include, but are not limited to, $Al_2O_3$, diamond-like carbon (DLC), or other hard materials. In certain embodiments, a protective coating 272 is also formed on the media-facing surface 270 of the transducer. The media-facing surface 270 is formed along one die edge. Note that in certain embodiments, the MR sensor 246 is alternatively formed after the formation of the inductive core that includes the first and second pole layers 250, 260, affording higher temperature processing of the write poles. In an alternative embodiments, sensing is performed inductively with the same transducer elements that are used to write magnetic patterns on the media, without the need for a MR sensor.

FIG. 8 schematically illustrates the magnetic head 200 disposed in close proximity to a medium 202, which is moving relative to the magnetic head 200 as shown by arrow 212. The medium 202 moves from a leading end 274 of the magnetic head 200 to the trailing end 275 of the magnetic head 200. Exemplary media 202 compatible with embodiments described herein include, but are not limited to, a disk or a tape. In the exemplary embodiment schematically illustrated in FIG. 8, the medium 202 includes a media layer or layers 205 disposed atop a substrate 208, with an overcoat layer 210 protecting the media layer 205. The first and second write pole layers 250, 260 form a magnetic circuit or loop to encourage the flow of magnetic flux across the write gap layer 252. An electrical current flowed through the coil 255 induces a magnetic flux in the first and second write pole layers 250, 260 that fringes out from the nonferromagnetic gap layer 252 to write a magnetic bit in the medial layer 205. The MR sensor 246 of certain embodiments reads magnetic bits that have been written on the medium 202.

Figure 9:
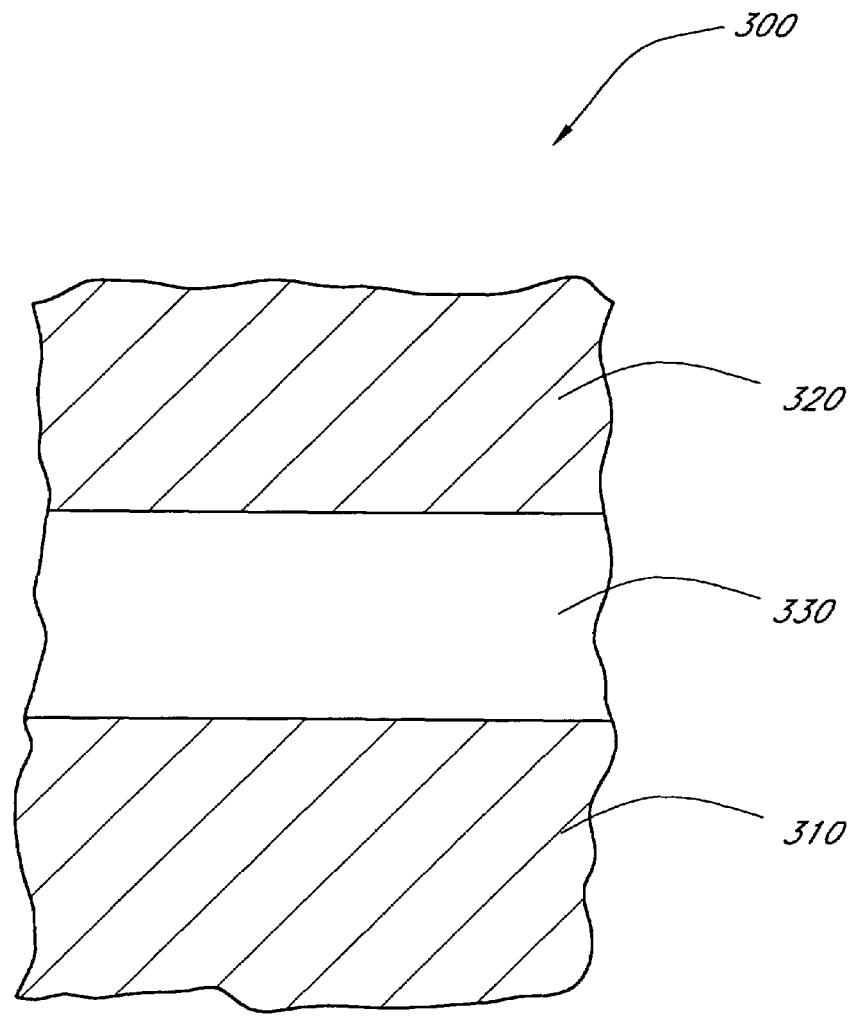
FIG. 9 schematically illustrates a cross-sectional view of a portion of an exemplary magnetic write head in accordance with certain embodiments described herein.

FIG. 9 schematically illustrates a cross-sectional view of a portion of an exemplary magnetic write head 300 in accordance with embodiments described herein. The magnetic write head 300 comprises a first pole 310, a second pole 320, and a write gap 330 between the first pole 310 and the second pole 320. In certain embodiments, the magnetic write head 300 is designed for perpendicular recording, as schematically illustrated in a cross-sectional view by FIG. 6. In certain such embodiments, the first pole 310, the second pole 320, and the write gap 330 in FIG. 9 corresponds to the first pole tip 170, the second pole tip 180, and the gap layer 174 of FIG. 6, respectively. In certain other embodiments, the magnetic write head 300 is designed for longitudinal recording, as schematically illustrated in cross-sectional views by FIGS. 7 and 8. In certain such embodiments, the first pole 310, the second pole 320, and the write gap 330 of FIG. 9 correspond to the first write pole 250, the second write pole 260, and the gap layer 252, respectively, of FIGS. 7 and 8.

Figure 10A:
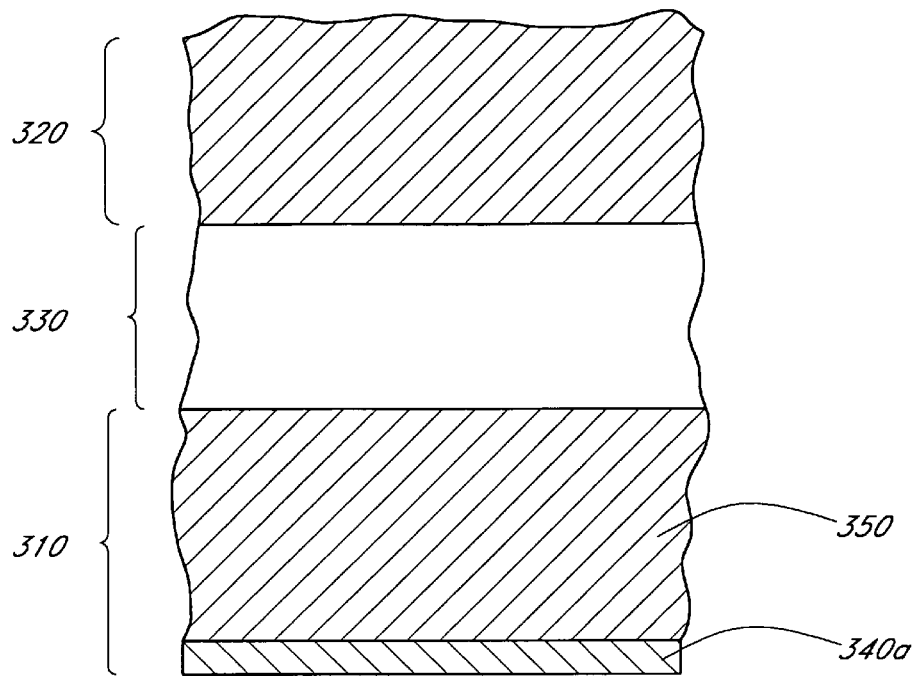
FIG. 10A schematically illustrates a first pole comprising a ferromagnetic seed layer and a magnetic layer.
Figure 10B:
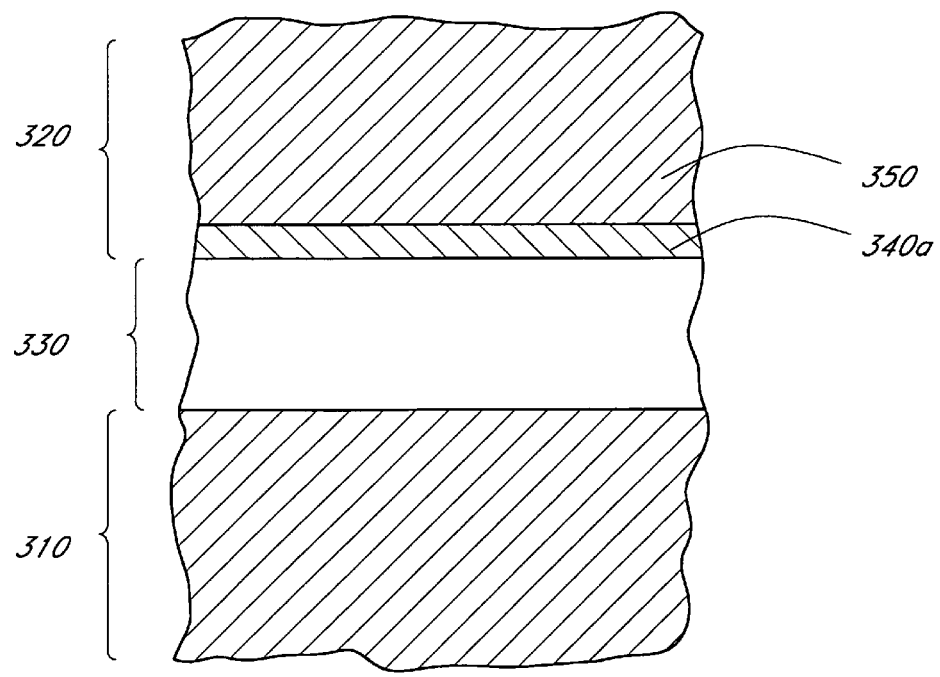
FIG. 10B schematically illustrates a second pole comprising a ferromagnetic seed layer and a magnetic layer.
Figure 10C:
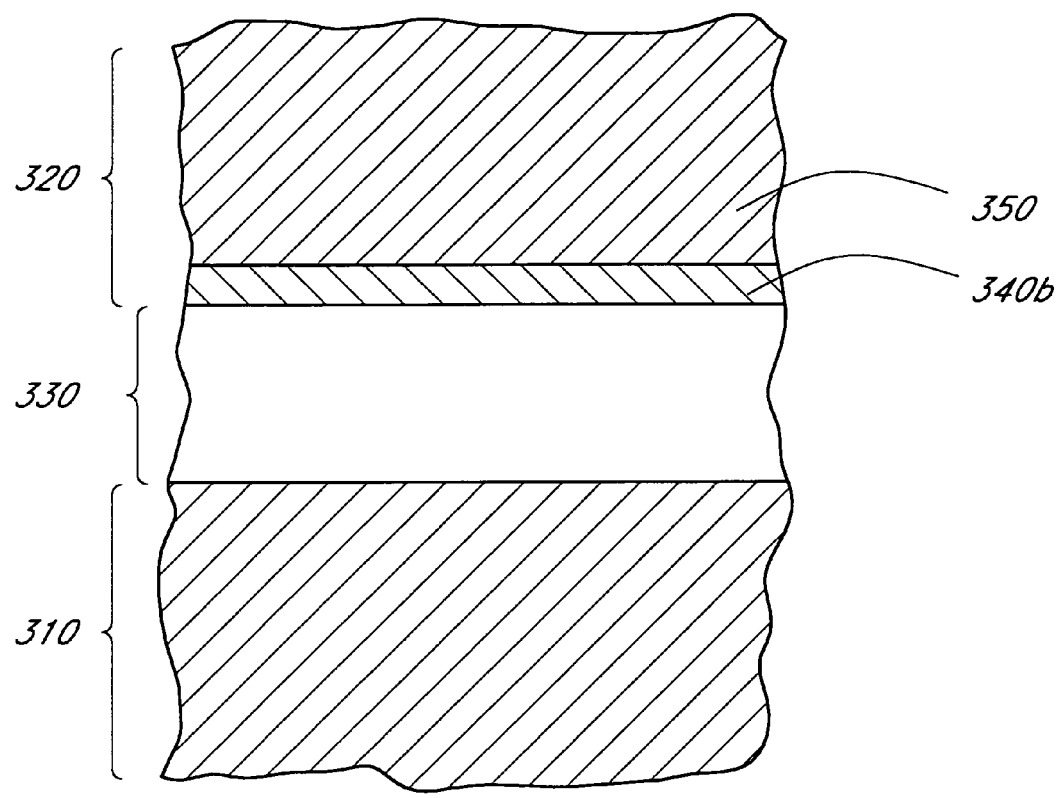
FIG. 10C schematically illustrates a write gap comprising a non-magnetic seed layer and a second pole comprising a magnetic layer.

FIGS. 10A-10C schematically illustrate a portion of a magnetic write head 300 in accordance with embodiments described herein. In certain embodiments, the magnetic write head 300 comprises a seed layer (denoted by 340a in FIGS. 10A and 10B, and denoted by 340b in FIG. 10C) comprising seed-layer grains. The magnetic write head 300 further comprises a magnetic layer 350 on the seed layer 340a, and the magnetic layer 350 comprises magnetic-layer grains. The seed-layer grains of certain embodiments have a face-centered-cubic (fcc) crystalline structure with a surface plane substantially oriented in a [111] direction. The seed-layer grains of certain other embodiments have a hexagonal-close-packed (hcp) crystalline structure with a surface plane substantially oriented in a [0001] direction. The magnetic-layer grains have a body-centered-cubic (bcc) crystalline structure with a surface plane substantially oriented in a [110] direction.

In certain embodiments, the magnetic write head 300 comprises a ferromagnetic seed layer 340a. In certain such embodiments, the first pole 310 comprises the ferromagnetic seed layer 340a and the magnetic layer 350, as schematically illustrated in FIG. 10A. In such embodiments, the ferromagnetic seed layer 340a is on an underlying layer (e.g., the layer 188 of FIG. 6 or the layer 235 of FIG. 7). In other embodiments, the second pole 320 comprises the ferromagnetic seed layer 340a and the magnetic layer 350, as schematically illustrated by FIG. 10B. In such embodiments, the ferromagnetic seed layer 340a is on an underlying layer (e.g., the gap layer 174 of FIG. 6 or the gap layer 252 of FIGS. 7 and 8). In certain embodiments, the ferromagnetic seed layer 340a has a thickness in a range between approximately 10 Angstroms and approximately 40 Angstroms. Other thicknesses of the ferromagnetic seed layer 340a are compatible with certain embodiments described herein.

In certain embodiments, the ferromagnetic seed layer 340a comprises seed-layer grains having the fcc crystalline structure and comprising a ferromagnetic nickel-iron alloy. The nickel-iron alloy of certain embodiments comprises between approximately 23 weight % iron and approximately 65 weight % iron. In certain other embodiments, the nickel-iron alloy comprises approximately 35 weight % iron.

In certain embodiments, the ferromagnetic seed layer 340a comprises seed-layer grains having the hcp crystalline structure and comprising a ferromagnetic material. Exemplary ferromagnetic materials in accordance with embodiments described herein include, but are not limited to, cobalt.

In certain embodiments, the magnetic write head 300 comprises a non-magnetic seed layer 340b. In certain embodiments, the write gap 330 comprises the non-magnetic seed layer 340b and the second pole 320 comprises the magnetic layer 350, as schematically illustrated by FIG. 10C. In such embodiments, the non-magnetic seed layer 340b is on a underlying layer (e.g., the gap layer 174 of FIG. 6 or the gap layer 252 of FIGS. 7 and 8). In certain such embodiments, the non-magnetic seed layer 340b can be considered to be a part of the gap layer 174 of FIG. 6 or the gap layer 252 of FIGS. 7 and 8. In certain embodiments, the non-magnetic seed layer 340b has a thickness in a range between approximately 10 Angstroms and approximately 1000 Angstroms. Other thicknesses of the non-magnetic seed layer 340b are compatible with embodiments described herein.

In certain embodiments, the non-magnetic seed layer 340b comprises seed-layer grains having the fcc crystalline structure and comprising a non-magnetic nickel-chromium alloy. The nickel-chromium alloy of certain embodiments comprises between approximately 10 weight % chromium and approximately 30 weight % chromium. In certain other embodiments, the nickel-chromium alloy comprises approximately 20 weight % chromium.

In certain embodiments, the non-magnetic seed layer 340b comprises seed-layer grains having the hcp crystalline structure and comprising a non-magnetic material. Exemplary non-magnetic materials in accordance with embodiments described herein include, but are not limited to, titanium.

In certain embodiments, the magnetic layer 350 comprises an iron-cobalt alloy. In certain such embodiments, the iron-cobalt alloy comprises between approximately 20 atomic % cobalt and approximately 50 atomic % cobalt. In other embodiments, the iron-cobalt alloy comprises approximately 30 atomic % cobalt. The iron-cobalt alloy of certain embodiments is doped with nitrogen having a concentration between approximately 0.05 atomic % nitrogen and approximately 2 atomic % nitrogen. In certain embodiments, the iron-cobalt alloy is doped with nitrogen and has a saturation magnetization of approximately 24.5 kilogauss. The magic layer 350 of certain embodiments has a thickness in a range between approximately 500 Angstroms and approximately 5000 Angstroms.

Each seed-layer grain of the seed layer 340 has a grain width in a plane generally parallel to the surface plane of the seed layer 340. The distribution of these grain widths averaged over the seed-layer grains defines an average in-plane seed-layer grain width for the seed layer 340. In certain embodiments, the average in-plane seed-layer grain width is in a range between approximately 50 Angstroms and approximately 500 Angstroms. Various seed-layer grain shapes, grain widths, grain sizes, and grain width distributions are compatible with embodiments described herein.

Similarly, each magnetic-layer grain of the magnetic layer 350 has a grain width in a plane generally parallel to the surface plane of the magnetic layer 350. The distribution of these grain widths averaged over the magnetic-layer grains defines an average in-plane magnetic-layer grain width for the magnetic layer 350. In certain embodiments, the average in-plane magnetic-layer grain width is in a range between approximately 10 Angstroms and approximately 300 Angstroms. Various magnetic-layer grain shapes, grain widths, grain sizes, and grain width distributions are compatibly with embodiments described herein.

In certain embodiments, the average in-plane seed-layer grain width is larger than the average in-plane magnetic-layer grain width. The average in-plane seed-layer grain width of certain such embodiments is between a factor of approximately two and a factor of approximately five larger than the average in-plane magnetic-layer grain width. Other ratios of the average in-plane seed-layer grain width and the average in-plane magnetic-layer grain width are also compatible with embodiments described herein.

Figure 11A:
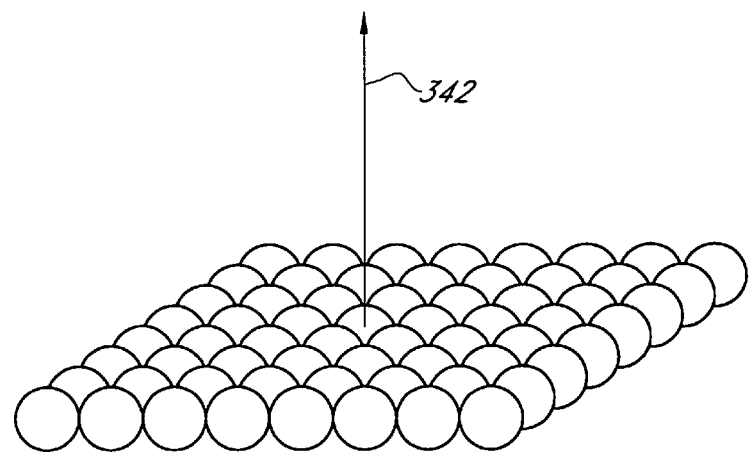
FIGS. 11A and 11B schematically illustrate the crystalline structure of the atomic surface plane of a seed-layer grain of the seed layer.
Figure 11B:
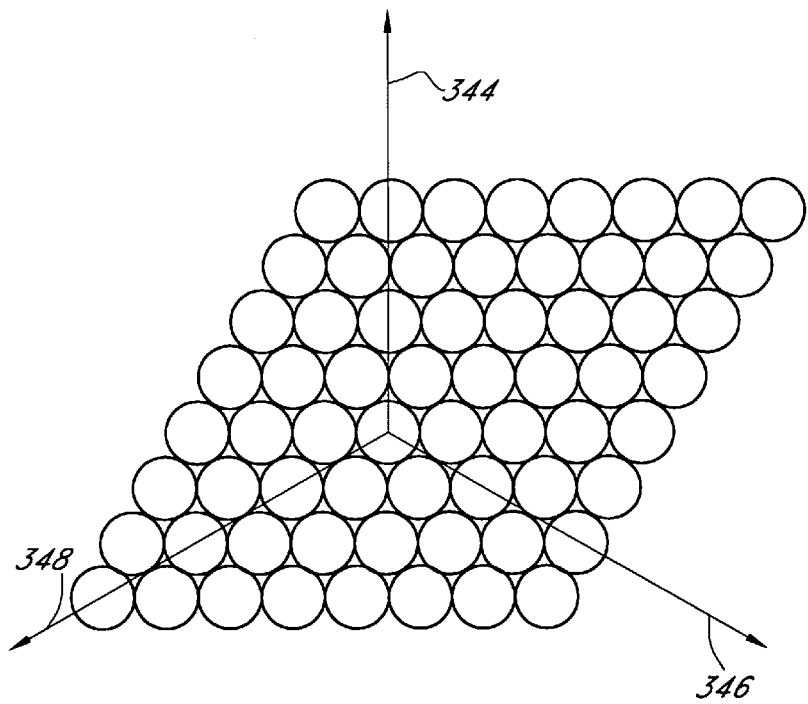

FIGS. 11A and 11B schematically illustrate the crystalline structure of the atomic surface plane of a seed-layer grain of the seed layer 340. As schematically illustrated in the perspective view of FIG. 11A, the surface plane of the seed-layer grain is substantially oriented in a source normal direction 342. In embodiments in which the seed-layer grain has an fcc crystalline structure, the surface normal direction 342 is substantially along the [111] direction. In certain such embodiments, fcc seed-layer grains with the [111] surface normal direction 342 have a lower surface energy than do grains with other surface normal directions, and so grains with the [111] surface normal direction are preferentially formed. In embodiments in which the seed-layer grain has an hcp crystalline structure, the surface normal direction 342 is substantially along the [0001] direction.

Whether the seed-layer grain has the fcc crystalline structure or the hcp crystalline structure, the surface plane of each seed-layer grain has a substantially hexagonally-symmetric surface crystalline structure, as schematically illustrated in the top-view of FIG. 11B. Each seed-layer grain has a first seed-layer in-plane crystallographic direction 344, a second seed-layer in-plane crystallographic direction 346, and a third seed-layer in-plane crystallographic direction 348, as schematically illustrated in the above-view of the surface plane in FIG. 11B. These three seed-layer in-plane crystallographic directions 344, 346, 348 are approximately 120 degrees from one another. The surface plane of the seed-layer grain is substantially symmetric about each of these three seed-layer in-plane crystallographic directions 344, 346, 348. In addition, each seed-layer grain 342 has substantially equivalent structure along these three seed-layer in-plane crystallographic directions 344, 346, 348.

Figure 12A:
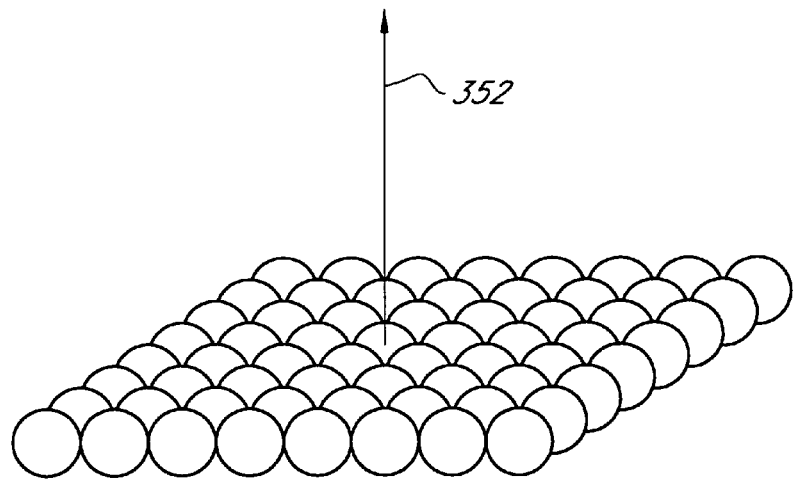
FIGS. 12A and 12B schematically illustrate the crystalline structure of the atomic surface plane of a magnetic-layer grain of the magnetic layer.
Figure 12B:
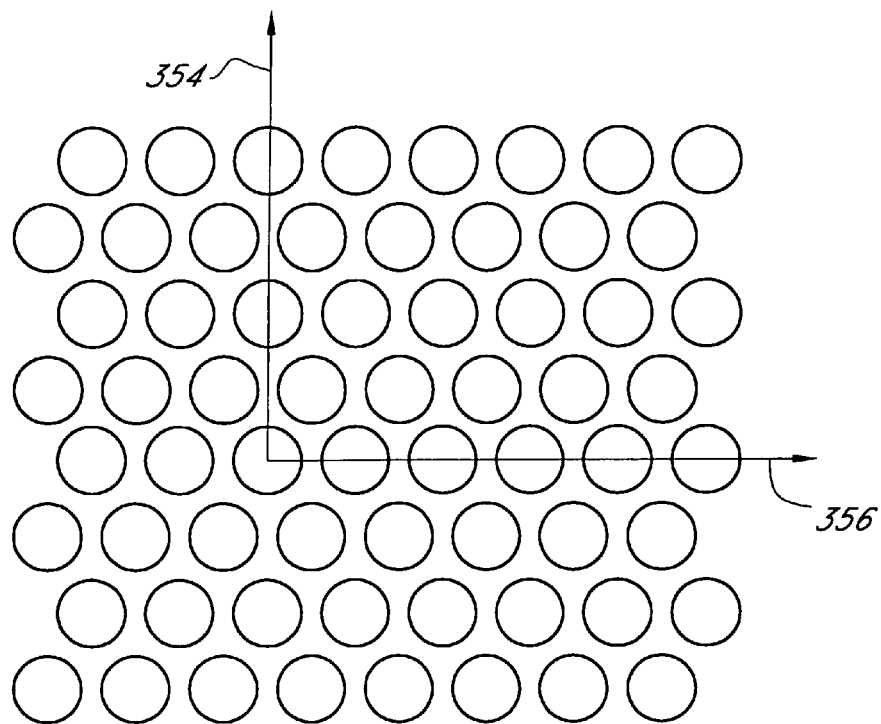

FIGS. 12A and 12B schematically illustrate the crystalline structure of the atomic surface plane of a magnetic-layer grain of the magnetic layer 350. As schematically illustrated in the perspective view of FIG. 12A, the surface plane of the magnetic-layer grain is substantially oriented in a surface normal direction 352. In embodiments in which the magnetic-layer grain has a bcc crystalline structure, the surface normal direction 352 is substantially along the [110] direction.

As schematically illustrated in the top-view of the surface plane in FIG. 12B, each magnetic-layer grain has a first magnetic-layer in-plane crystallographic direction 354 and a second magnetic-layer in-plane crystallographic direction 356. These two magnetic-layer in-plane crystallographic directions 354, 356 are approximately 90 degrees from one another. The surface plane of each magnetic-layer grain is substantially symmetric about each of these two magnetic-layer in-plane crystallographic directions 354, 356. However, the surface crystallographic structures of the magnetic-layer grain along each of these two magnetic-layer in-plane crystallographic directions 354, 356 are substantially inequivalent to one another.

Figure 13A:
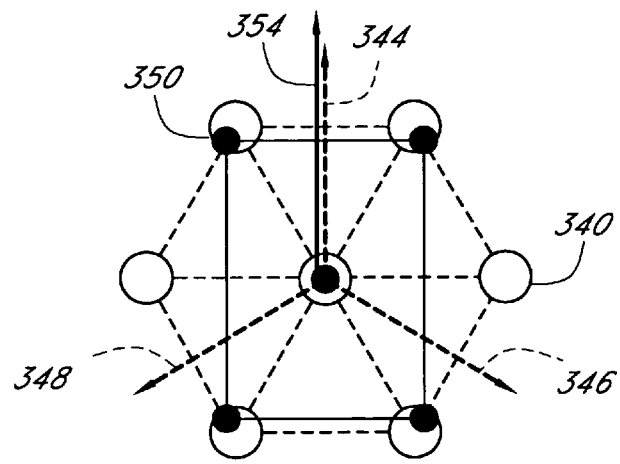
FIGS. 13A-13C schematically illustrate the orientation of three different magnetic-layer grains of the magnetic layer on a hexagonally-symmetric seed-layer grain of the seed layer.
Figure 13B:
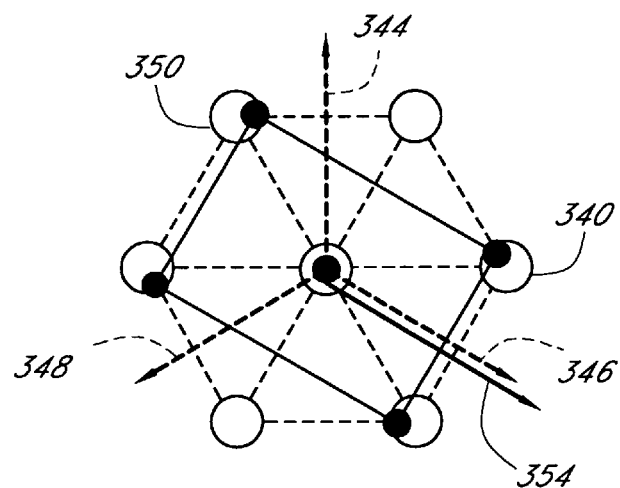
Figure 13C:
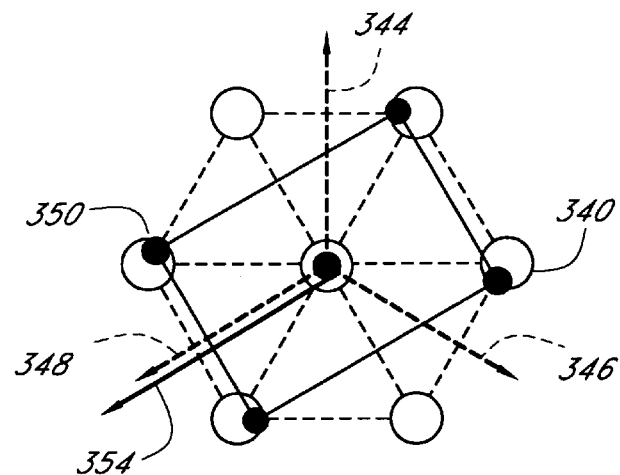

FIGS. 13A-13C schematically illustrate the orientation of three different magnetic-layer grains of the magnetic layer 350 on a hexagonally-symmetric seed-layer grain of the seed layer 340. In certain embodiments in which the seed-layer grain has an fcc crystalline structure with a surface normal in the [1 1 1] direction, the three seed-layer in-plane crystallographic directions 344, 346, 348 correspond to the [1 1 $\bar{2}$], [1 $\bar{2}$ 1], and [$\bar{2}$ 1 1] directions, respectively. In certain embodiments in which the magnetic-layer grain has a bcc crystalline structure with a surface normal in the [1 1 0] direction, the two magnetic-layer in-plane crystallographic directions 354, 356 correspond to the [1 $\bar{1}$ 0] and [0 0 1] directions, respectively.

In FIG. 13A, the magnetic-layer grain has a crystalline structure with the first magnetic-layer in-plane crystallographic direction 354 generally parallel to the first seed-layer in-plane crystallographic direction 344. In FIG. 13B, the magnetic-layer grain has a crystalline structure with the first magnetic-layer in-plane crystallographic direction 354 generally parallel to the second seed-layer in-plane crystallographic direction 346. In FIG. 13C, the magnetic-layer grain has a crystalline structure with the first magnetic-layer in-plane crystallographic direction 354 generally parallel to the third seed-layer in-plane crystallographic direction 348. FIGS. 13A-13C schematically illustrate embodiments in which the atoms of the magnetic layer 350 are generally directly above the atoms of the seed layer 340. Other configurations (e.g., atoms of the a magnetic layer 350 are generally directly above the regions between the atoms of the seed layer 340) are also compatible with embodiments described herein.

In certain embodiments, the alignment of the crystalline structures of the seed-layer grain and the magnetic-layer grain as schematically illustrated in FIGS. 13A-13C results from lattice matching of the crystalline structures. For example, for certain embodiments in which the seed-layer grains have the fcc crystalline structure and the magnetic-layer grains have the bcc crystalline structure, the distance between atoms of the seed-layer grain along the [1 1 $\bar{2}$] direction is approximately equal to the distance between atoms of the magnetic-layer grain along the [1 $\bar{1}$ 0] direction.

Therefore, when grown on an fcc seed-layer grain with its surface normal in the [1 1 1] direction, the bcc magnetic-layer grain has its surface normal in the [1 1 0] direction, and the [1 $\bar{1}$ 0] direction of the bcc magnetic-layer grain is generally parallel to one of the [1 1 $\bar{2}$], [1 $\bar{2}$ 1], or [$\bar{2}$ 1 1] directions of the underlying fcc seed-layer grain.

The magnetic layer 350 comprises a plurality of magnetic-layer grains, which have an in-plane grain orientation distribution. In certain embodiments, the distribution comprises approximately equal proportions of magnetic-layer grains having a crystal structure with the first magnetic-layer in-plane crystallographic direction 354 generally parallel to the first seed-layer in-plane crystallographic direction 344 (as schematically illustrated in FIG. 13A), magnetic-layer grains having a crystal structure with the first magnetic-layer in-plane crystallographic direction 354 generally parallel to the second seed-layer in-plane crystallographic direction 346 (as schematically illustrated by FIG. 13B), and magnetic-layer grains having a crystal structure with the first magnetic-layer in-plane crystallographic direction 354 generally parallel to the third seed-layer in-plane crystallographic direction 348 (as schematically illustrated by FIG. 13C). In certain embodiments, because the three seed-layer in-plane crystallographic directions 344, 346, 348 are substantially equivalent, the magnetic-layer grains of the magnetic layer 350 grown on the seed-layer grain of the seed layer 340 have approximately equal proportions of the magnetic-layer grains crystallographically aligned with the three seed-layer in-plane crystallographic directions 344, 346, 348.

Figure 14A:
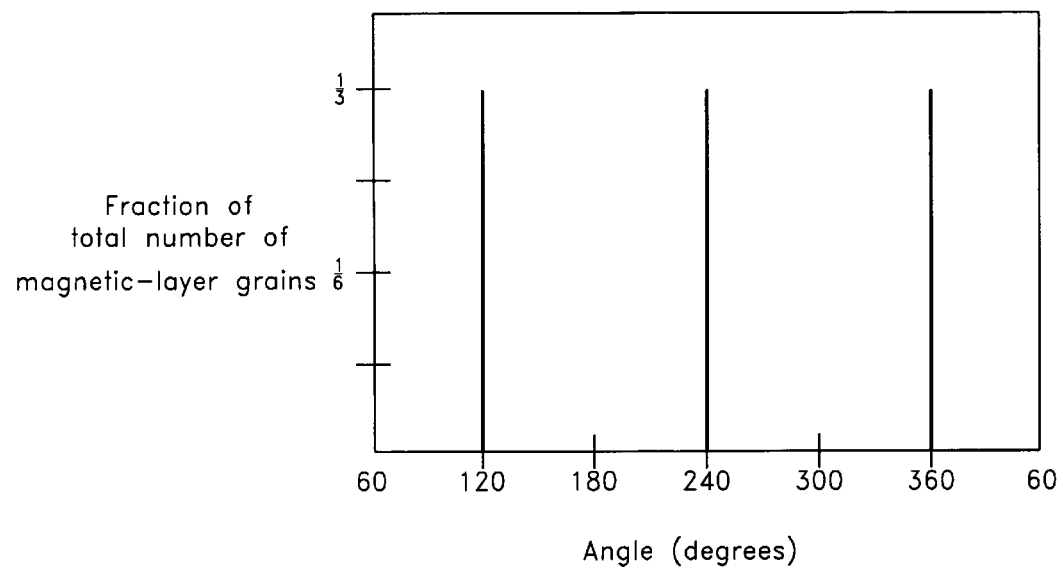
FIGS. 14A and 14B schematically illustrate two examples of an in-plane orientation distribution of the magnetic layer.
Figure 14B:
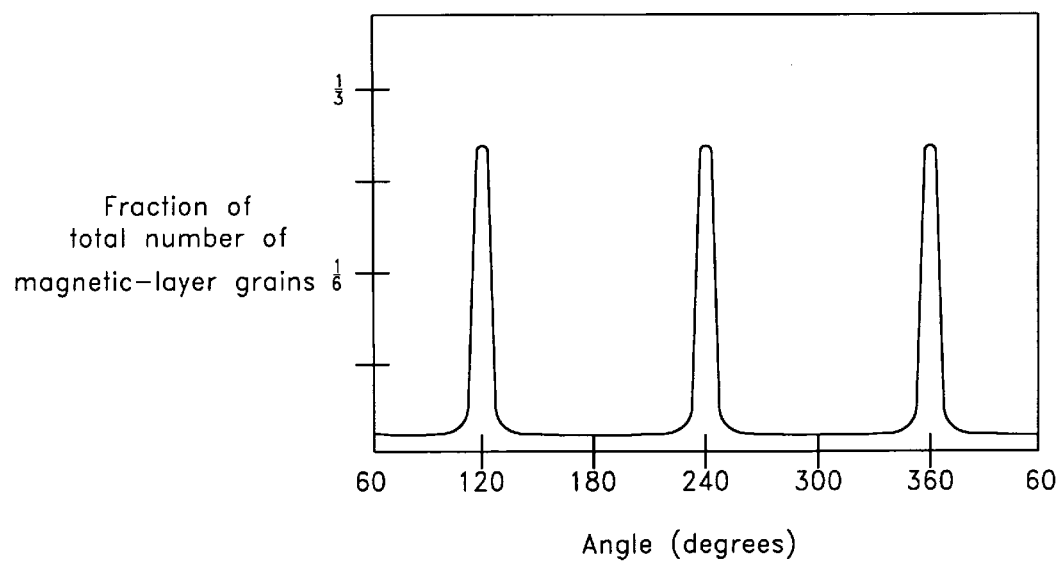

FIGS. 14A and 14B schematically illustrate two examples of such an in-plane grain orientation distribution of the magnetic layer 350. In certain embodiments, the distribution comprises one-third of the magnetic-layer grains in each of these three orientations, as schematically illustrated by FIG. 14A. In other embodiments, the distribution comprises less than one-third of the magnetic-layer grains in each of these orientations, but each of these orientations has approximately the same number of magnetic-layer grains, as schematically illustrated by FIG. 14B. Some of the other magnetic-layer grains have orientations that are generally parallel to these three orientations (shown by the width of the peaks in the distribution of FIG. 14B), and some have orientations that are generally random (shown by the non-zero base level of the distribution of FIG. 14B). Other in-plane grain orientations distributions for the magnetic layer 350 are compatible with embodiments described herein.

In certain embodiments, such in-plane grain orientation distributions (e.g., those illustrated in FIGS. 14A and 14B) provide the magnetic layer 350 with soft-magnetic properties, due to the cancelled magneto-crystalline anisotropy and magneto-elastic energies. In addition, in certain embodiments, the average in-plane grain width of the fcc seed layer 340 is larger than the average in-plane grain width of the bcc magnetic layer 350, such that a single seed-layer grain has several magnetic-layer grains grown on top of the seed-layer grain. In certain such embodiments, at least a portion of the magnetic-crystalline anisotropy and magneto-elastic energies are cancelled by the different magnetic-layer grains.

Figure 15:
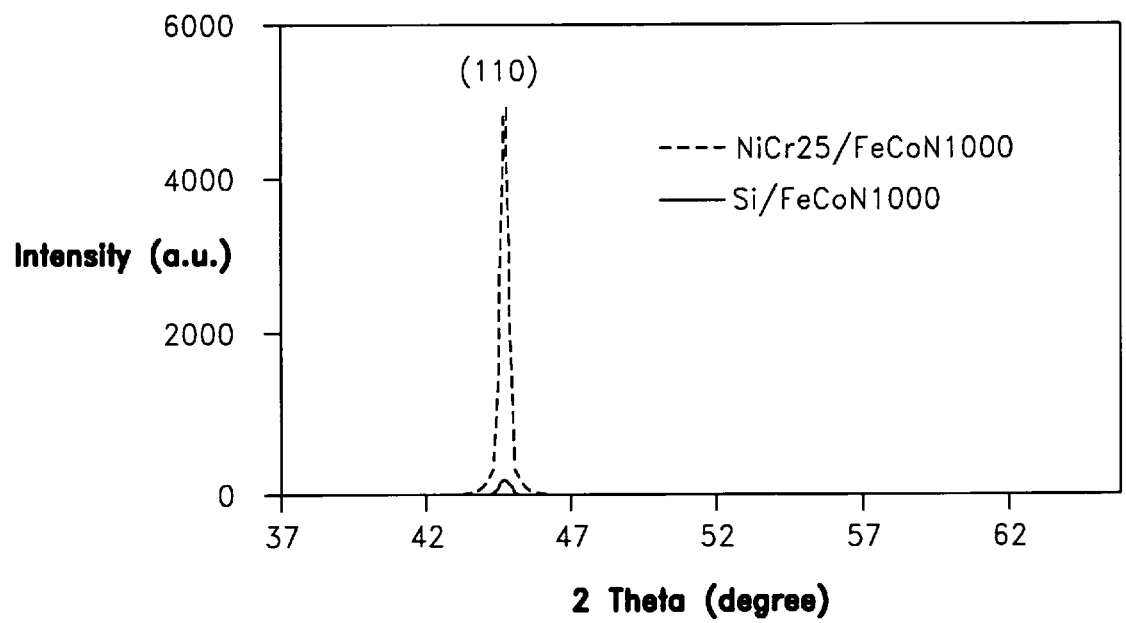
FIG. 15 schematically illustrates x-ray diffraction plots obtained from (1) a 1000-Angstrom FeCoN magnetic layer formed on a silicon substrate wafer (solid line), and (2) an examplary 1000-Angstrom FeCoN magnetic layer formed on a 25-Angstrom NiCr seed layer (dashed line).

FIG. 15 schematically illustrates x-ray diffraction plots obtained from (1) a 1000-Angstrom FeCoN magnetic layer formed on a silicon substrate wafer (solid line), and (2) an exemplary 1000-Angstrom FeCoN magnetic layer 350 formed on a 25-Angstrom NiCr seed layer 340 (dashed line). As shown by FIG. 15, the FeCoN magnetic layer 350 formed on the NiCr seed layer 340 has a bcc crystal structure with a much stronger [110] peak than does the layer formed on the silicon substrate wafer. The stronger [110] peak indicates stronger [110] texture growth of the magnetic layer 350 on the seed layer 340. X-ray diffraction therefore provides evidence of the preferential growth of FeCoN magnetic-layer grains having a bcc crystal structure with a surface normal along the [110] direction when grown on NiCr seed-layer grains having an fcc crystal structure with a surface normal along the [111] direction.

Figure 16:
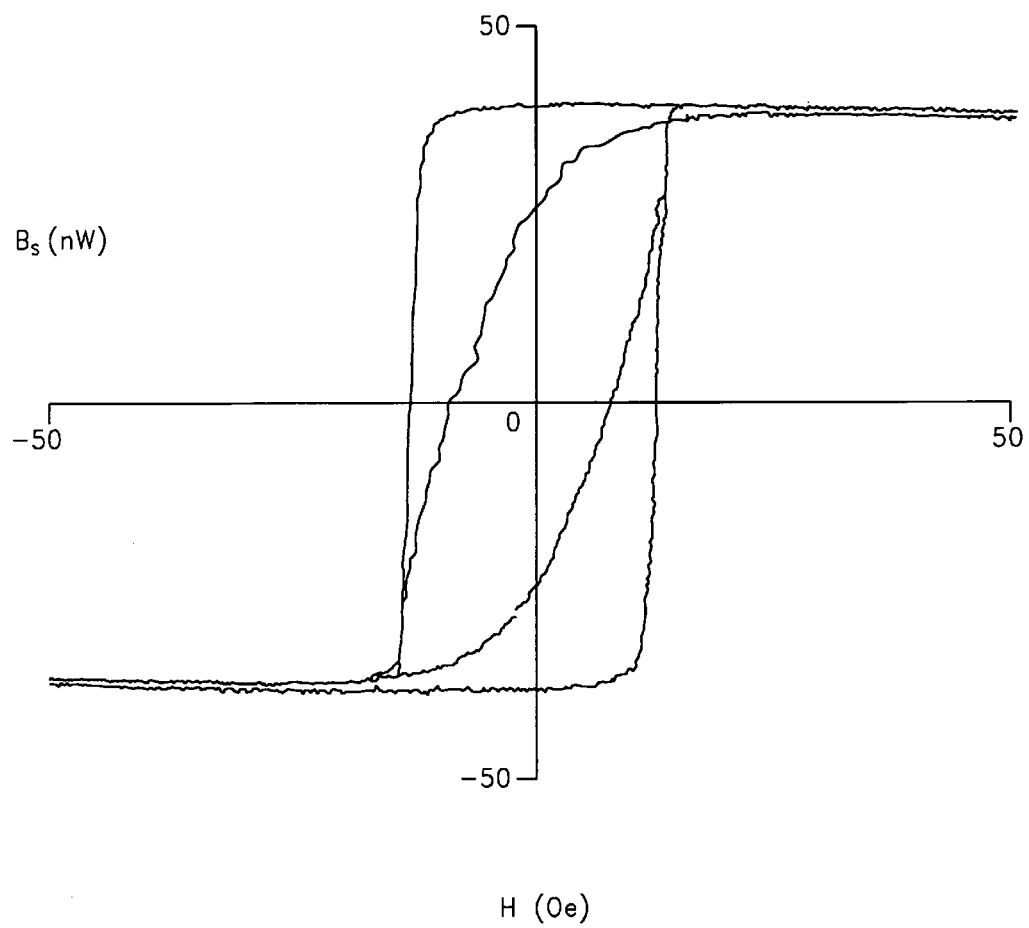
FIG. 16 schematically illustrates a B-H loop for an examplary 2000-Angstrom FeCoN magnetic layer formed on a 25-Angstrom NiCr seed layer on a silicon substrate wafer.

FIG. 16 schematically illustrates a B-H loop for an examplary 2000-Angstrom FeCoN magnetic layer 350 formed on a 25-Angstrom NiCr seed layer 340 on a silicon substrate wafer. The magnetic layer 350 that produced the B-H loop of FIG. 16 was deposited while an external magic field was applied in a selected direction that defined the easy-axis direction. The B-H loop of FIG. 16 shows generally good soft-magnetic performance with a magnetization of the magnetic layer 350 along the easy-axis direction of $H_c$=6.8 oersteds at $B_H$=0. The magnetization of the magnetic layer 350 along the hard-axis direction (which is 90 degrees from the easy-axis direction) is $H_c$=12.08 oersteds at $B_H$=0. The magnetization at which saturation occurs is approximately $H_k$=18.6 oersteds. The magnetic layer 350 has a roughness of approximately 3 Angstroms. Such properties are compatible with embodiments in which the magnetic layer 350 is used as a pole material in a magnetic head. In addition, in certain embodiments, the magnetic layer 350 is used as a shield material in a magnetic head. In still other embodiments, the magnetic layer 350 is used as an underlayer in a magnetic medium.

Incorporation of high-moment FeCoN alloy/NiCr alloy thin films in magnetic heads in accordance with certain embodiments described herein advantageously increases the magnetic field gradient produced by the magnetic head. Such increased magnetic field gradients advantageously improve both the overwrite (OW) and non-linear transition shift (NLTS), e.g., by approximately 1-2 decibels, as compared to prior art magnetic heads. Certain embodiments also significantly improve the manufacturing yield of such magnetic heads, thereby decreasing production costs. Certain embodiments are advantageously used for high data rate applications (e.g., up to approximately 1000 Megabits per second) and for high areal density applications (e.g., above 100 Gigabits per square inch).

Figure 17:
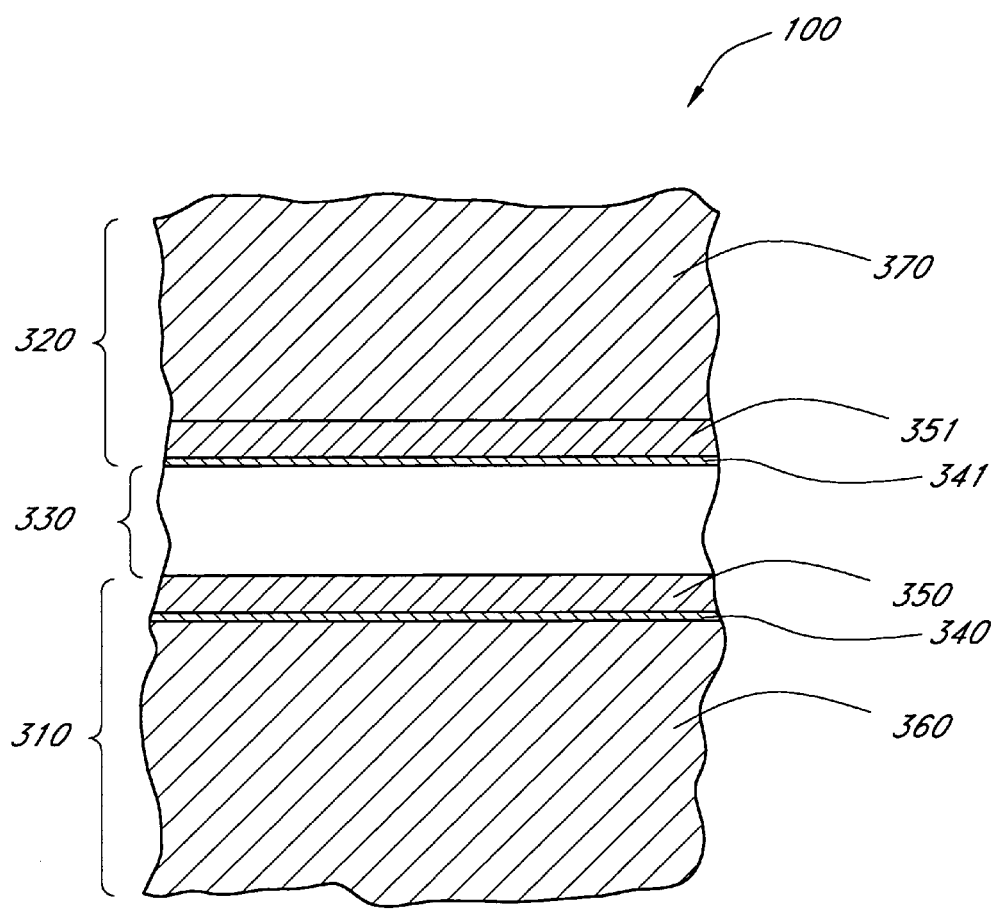
FIG. 17 schematically illustrates a portion of an examplary magnetic head having a first seed layer, a first magnetic layer, a second seed layer, and a second magnetic layer.

FIG. 17 schematically illustrates a portion of an examplary magnetic head 100 having a first seed layer 340, a first magnetic layer 350, a second seed layer 341, and a second magnetic layer 351. The first magnetic layer 350 is on the first seed layer 340, which is on a first pole material 360, and the first magnetic layer 350 is part of the first pole 310. The first pole material 360 comprises a ferromagnetic material (e.g., CoNiFe alloy) which, in certain embodiments, has a thickness less than 5 microns (e.g., between approximately 0.5 micron and approximately 3 microns), and which is formed (e.g., by electroplating) on an underlying layer or substrate. In certain such embodiments, the first seed layer 340 has a thickness in a range between approximately 10 Angstroms and approximately 40 Angstroms (e.g., 25 Angstroms). The first seed layer 340 of certain embodiments is ferromagnetic (e.g., NiFe alloy). The first magnetic layer 350 is ferromagnetic (e.g., FeCoN alloy) and, in certain embodiments, has a thickness in a range between approximately 100 Angstroms and approximately 5000 Angstroms (e.g., approximately 2000 Angstroms).

In certain embodiments, the second magnetic layer 351 is on the second seed layer 341, which is on the write gap layer 330, and the second magnetic layer 351 is part of the second pole 320. The second pole 320 further comprises a second pole material 370 on the second magnetic layer 351. In certain embodiments, the write gap layer 330 comprises a non-magnetic material (e.g., tantalum) with a thickness less than 5 microns (e.g., between approximately 500 Angstroms and approximately 1000 Angstroms) and which is formed on the first magnetic layer 350. In certain embodiments, the second seed layer 341 is magnetic (e.g., NiFe alloy) and has a thickness in a range between approximately 10 Angstroms and approximately 40 Angstroms (e.g., 25 Angstroms). In certain other embodiments, the second seed layer 341 is non-magnetic (e.g., NiCr alloy), and has a thickness in a range between approximately 10 Angstroms and approximately 1000 Angstroms. In certain such embodiments, the second seed layer 341 comprises a substantial portion or all of the write gap layer 330. The second magnetic layer 351 is ferromagnetic (e.g., FeCoN alloy) and, in certain embodiments, has a thickness in a range between approximately 100 Angstroms and approximately 5000 Angstroms (e.g., approximately 2000 Angstroms). The second pole material 370 is ferromagnetic (e.g., CoNiFe alloy) and is formed (e.g., by electroplating) on the second magnetic layer 351.

In the embodiment schematically illustrated by FIG. 17, the first magnetic layer 350 provides a first flux enhancement layer for the first pole 310, and the second magnetic layer 351 provides a second flux enhancement layer for the second pole 320. In embodiments in which the first and second magnetic layers 350, 351 have higher magnetic moments than the other portions of the first and second poles 310, 320, the first and second magnetic layers 350, 351 conduct a larger fraction of the magnetic flux through the first and second poles 310, 320.

Figure 18:
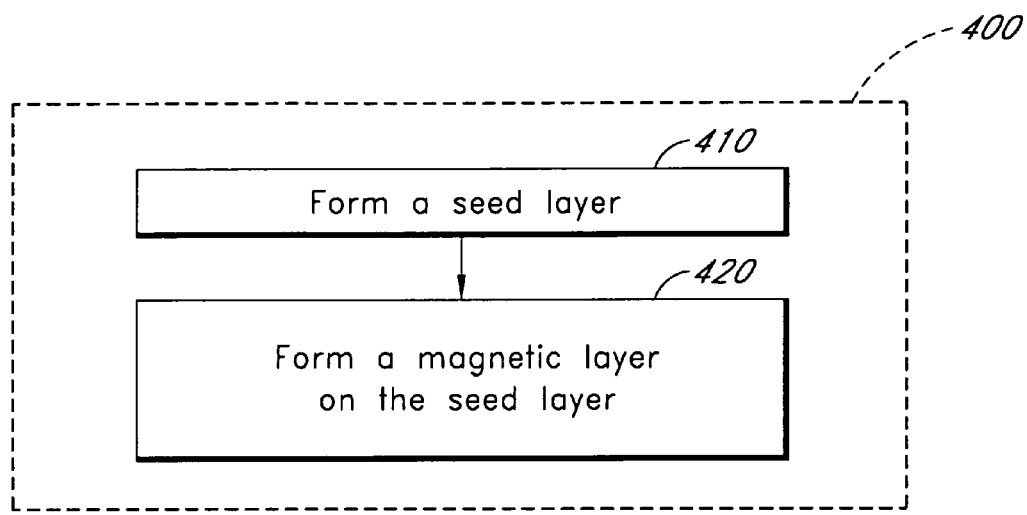
FIG. 18 is a flowchart of an examplary method of forming a magnetic write head.

FIG. 18 is a flowchart of an examplary method 400 of forming a magnetic write head. The method 100 comprises forming a seed layer 340 comprising seed-layer grains in an operational block 410. The seed-layer grains has either a face-centered-cubic (fcc) crystalline structure with a surface plane substantially oriented in a [111] direction or a hexagonal-close-packed (hcp) crystalline structure with a surface plane substantially oriented in a [0001] direction. The method 100 further comprises forming a magnetic layer 350 on the seed layer 340 in an operational block 420. The magnetic layer 350 comprises magnetic-layer grains having a body-centered-cubic (bcc) crystalline structure with a surface plane substantially oriented in a [110] direction.

In certain embodiments, forming the seed layer 340 in the operational block 410 comprises at least one deposition process selected from the group consisting of: DC magnetron sputtering, RF magnetron sputtering, RF diode sputtering, and ion-beam deposition. In certain embodiments, forming the magnetic layer 350 in the operational block 420 comprises at least one deposition process selected from the group consisting of: DC magnetron sputtering, RF magnetron sputtering, RF diode sputtering, and ion-beam deposition. In certain embodiments, forming the seed layer 340 in the operational block 410 and forming the magnetic layer 350 in the operational block 420 both comprises DC magnetron spattering. Persons skilled in the art are able to select appropriate deposition processes in accordance with embodiments described herein.

In certain embodiments, the seed layer 340 is non-magnetic. In certain such embodiments, forming the seed layer 340 in the operational block 410 comprises a deposition process, which is terminated once the seed layer 340 has a predetermined thickness. In certain embodiments, the predetermined thickness is in a range between approximately 10 Angstroms and approximately 1000 Angstroms. In still other embodiments, the deposition process for forming the seed layer 340 is conducted at a predetermined power level for a predetermined time period. Persons skilled in the art are able to select appropriate power levels and time periods in accordance with embodiments described herein.

In certain embodiments, the seed layer 340 is ferromagnetic. In certain such embodiments, forming the seed layer 340 in the operational block 410 comprises a deposition process, which is terminated once the seed layer 340 has a predetermined thickness. In certain embodiments, the predetermined thickness is in a range between approximately 10 Angstroms and approximately 40 Angstroms. In still other embodiments, the deposition process for forming the magnetic layer 350 is conducted at a predetermined power level for a predetermined time period. Persons skilled in the art are able to select appropriate power levels and time periods in accordance with embodiments described herein.

Table 1 lists various parameters of an exemplary fabrication process for forming a NiFe seed layer using DC magnetron sputtering and forming a FeCoN magnetic layer on the seed layer DC magnetron sputtering. Other deposition techniques and deposition parameters are compatible with certain embodiments described herein.

TABLE 1

| Layer | Thickness (Angstroms) | Deposition Power (Watts) | Target-Wafer Distance (Inches) | Substrate Bias (Volts) |
|---|---|---|---|---|
| NiFe seed layer | 20-30 | 400 | 4 | 100 |
| FeCoN magnetic layer | 1000-3000 | 1000 | 4 | 0 |

What is claimed is:

1. A magnetic write head comprising:
   a seed layer comprising seed-layer grains having either a face-centered cubic (fcc) crystalline structure with a surface plane substantially oriented in a [111] direction or a hexagonal-close-packed (hcp) crystalline structure with a surface plane substantially oriented in a [0001] direction; and
   a magnetic layer on the seed layer, the magnetic layer comprising magnetic-layer grains having a body-centered-cubic (bcc) crystalline structure with a surface plane substantially oriented in a [110] direction, wherein the seed-layer grains have an average in-plane seed-layer grain width and the magnetic-layer grains have an average in-plane magnetic-layer grain width smaller than the average in-plane seed-layer grain width.

2. The magnetic write head of claim 1, wherein the seed layer is ferromagnetic.

3. The magnetic write head of claim 2, wherein the seed-layer grains have the fcc crystalline structure and comprise a ferromagnetic nickel-iron alloy.

4. The magnetic write head of claim 2, wherein the seed-layer grains have the hcp crystalline structure and comprise cobalt.

5. The magnetic write head of claim 2, wherein the seed layer has a thickness in a range between approximately 10 Angstroms and approximately 40 Angstroms.

6. The magnetic write head of claim 1, wherein the seed layer is non-magnetic.

7. The magnetic write head of claim 6, wherein the seed-layer grains have the fcc crystalline structure and comprises a non-magnetic nickel-chromium alloy.

8. The magnetic write head of claim 6, wherein the seed-layer grains have the hcp crystalline structure and comprise titanium.

9. The magnetic write head of claim 6, wherein the seed layer has a thickness in a range between approximately 10 Angstroms and approximately 1000 Angstroms.

10. The magnetic write head of claim 1, wherein the magnetic layer comprises an iron-cobalt alloy.

11. The magnetic write head of claim 10, wherein the iron-cobalt alloy is doped with nitrogen.

12. The magnetic write head of claim 11, wherein the iron-cobalt alloy comprises between approximately 0.05 atomic % and 2 atomic % nitrogen.

13. The magnetic write head of claim 1, wherein the magnetic layer has a thickness in a range between approximately 100 Angstroms and approximately 5000 Angstroms.

14. The magnetic write head of claim 1, wherein the magnetic layer has a thickness of approximately 2000 Angstroms.

15. The magnetic write head of claim 1, wherein the seed-layer grains have an average in-plane seed-layer grain width in a range between approximately 50 Angstroms and approximately 500 Angstroms.

16. The magnetic write head of claim 15, wherein the magnetic layer grains have an average in-plane magnetic-layer grain width in a range between approximately 10 Angstroms and approximately 300 Angstroms.

17. The magnetic write head of claim 1, wherein the average in-plane seed-layer grain width is between a factor of approximately two and a factor of approximately five larger than the average in-plane magnetic-layer grain width.

18. A magnetic write head comprising:
   a seed layer comprising seed-layer grains having either a face-centered cubic (fcc) crystalline structure with a surface plane substantially oriented in a [111] direction or a hexagonal-close-packed (hcp) crystalline structure with a surface plane substantially oriented in a [0001] direction; and
   a magnetic layer on the seed layer, the magnetic layer comprising magnetic-layer grains having a body-centered-cubic (bcc) crystalline structure with a surface plane substantially oriented in a [110] direction, wherein the magnetic-layer grains have an in-plane grain orientation distribution which comprises approximately equal proportions of three crystallographic directions oriented approximately 120 degrees from one another.

* * * * *

UNITED STATES PATENT AND TRADEMARK OFFICE
CERTIFICATE OF CORRECTION

| | | |
|---|---|---|
| PATENT NO. | : 7,522,377 B1 | Page 1 of 1 |
| APPLICATION NO. | : 11/009753 | |
| DATED | : April 21, 2009 | |
| INVENTOR(S) | : Jiang et al. | |

It is certified that error appears in the above-identified patent and that said Letters Patent is hereby corrected as shown below:

Column 16, Line 63: Delete "comprises" and insert --comprise--.
(Claim 7, Line 2)

Signed and Sealed this

Twenty-fourth Day of August, 2010

David J. Kappos
*Director of the United States Patent and Trademark Office*